United States Patent
Teyeb et al.

(10) Patent No.: US 9,049,627 B2
(45) Date of Patent: Jun. 2, 2015

(54) HANDOVER AND NEIGHBOR MANAGEMENT FOR MOBILE RELAY NODES

(75) Inventors: Oumer Teyeb, Stockholm (SE); Fredrik Gunnarsson, Linköping (SE); Gunnar Mildh, Sollentuna (SE); Jessica Östergaard, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 161 days.

(21) Appl. No.: 13/383,093

(22) PCT Filed: Dec. 15, 2011

(86) PCT No.: PCT/SE2011/051515
§ 371 (c)(1),
(2), (4) Date: Jun. 12, 2012

(87) PCT Pub. No.: WO2012/158085
PCT Pub. Date: Nov. 22, 2012

(65) Prior Publication Data
US 2012/0329461 A1    Dec. 27, 2012

Related U.S. Application Data

(60) Provisional application No. 61/486,027, filed on May 13, 2011.

(51) Int. Cl.
*H04W 36/00* (2009.01)
*H04W 36/08* (2009.01)
(Continued)

(52) U.S. Cl.
CPC ............ *H04W 36/0061* (2013.01); *H04W 8/26* (2013.01); *H04W 36/0083* (2013.01); *H04W 36/08* (2013.01); *H04W 84/005* (2013.01); *H04W 84/047* (2013.01)

(58) Field of Classification Search
CPC ... H04W 36/0061; H04W 8/26; H04W 36/83; H04W 36/08; H04W 84/005; H04W 84/047; H04W 24/02; H04W 36/0083; H04W 84/042; H04W 16/00; H04W 36/0055; H04W 36/02; H04W 36/12; H04W 48/08; H04W 84/045; H04W 88/00
USPC .............. 455/436, 450, 437, 67.11, 453, 438, 455/434; 370/332, 329; 340/7.34
See application file for complete search history.

(56) References Cited

U.S. PATENT DOCUMENTS

2008/0200172 A1 *  8/2008  Voyer et al. .................... 455/436
2008/0207207 A1 *  8/2008  Moe et al. ...................... 455/439
(Continued)

FOREIGN PATENT DOCUMENTS

EP      1959701 A1    8/2008

OTHER PUBLICATIONS

Teyeb, O. et al., "Handover Framework for Relay Enhanced LTE Networks", IEEE International Conference, Jun. 14, 2009, pp. 1-5, Piscataway, NJ.
(Continued)

*Primary Examiner* — Mahendra Patel
(74) *Attorney, Agent, or Firm* — Coats & Bennett, P.L.L.C.

(57) ABSTRACT

Some embodiments provide a mobile relay node, RN, (16) with complete and valid neighbor cell information. The RN (16) requests this information from a donor base station (12) upon detecting a defined condition characteristically indicating that movement of the RN (16) has rendered previously obtained neighbor cell information incomplete or invalid. The RN (16) may generate the request to identify cells (18) currently neighboring the mobile cell (20). The donor base station (12) may then provide the RN (16) information that more specifically pertains to the mobile cell's neighbors, rather than generally pertaining to the donor cell's neighbors. Other embodiments compensate for the RN's incomplete or invalid neighbor cell information. These embodiments permit the RN (16) to identify a target cell (18) with a non-unique cell identifier in a handover message sent to the donor base station (12). The donor base station (12) resolves this non-unique identifier and replaces it with the corresponding unique identifier for sending the message towards the target cell (18).

21 Claims, 17 Drawing Sheets

(51) Int. Cl.
*H04W 8/26* (2009.01)
*H04W 84/00* (2009.01)
*H04W 84/04* (2009.01)

(56) References Cited

U.S. PATENT DOCUMENTS

| | | | |
|---|---|---|---|
| 2008/0207209 | A1 | 8/2008 | Katori et al. |
| 2009/0047955 | A1* | 2/2009 | Frenger et al. ............ 455/436 |
| 2009/0047958 | A1 | 2/2009 | Rimhagen et al. |
| 2010/0020776 | A1 | 1/2010 | Youssef et al. |
| 2010/0061339 | A1* | 3/2010 | Kim et al. ................ 370/331 |
| 2010/0178912 | A1 | 7/2010 | Gunnarsson et al. |
| 2011/0080892 | A1* | 4/2011 | Cai et al. ................ 370/331 |
| 2011/0244851 | A1* | 10/2011 | Gunnarsson et al. ........ 455/423 |
| 2011/0274097 | A1* | 11/2011 | Zhang et al. .............. 370/338 |
| 2011/0310791 | A1* | 12/2011 | Prakash et al. ............ 370/315 |
| 2012/0155377 | A1* | 6/2012 | Chai ...................... 370/315 |

OTHER PUBLICATIONS

Huawei, "Detection of conflicting cell identities," 3GPP TSG RAN WG3 Meeting #57bis, Oct. 8-11, 2007, Sophia Antipolis, France, R3-071947.

Qualcomm Europe, "Email discussion on the need of CSG cell specific PCIs," 3GPP TSG-RAN WG 2 meeting #62, May 5-9, 2008, Kansas City, Missouri.

3GPP. "Technical Specification Group Radio Access Network;Evolved Universal Terrestrial Radio Access (E-UTRA) and Evolved Universal Terrestrial Radio Access Network (E-UTRAN); Overall description; Stage 2 (Release 9)" 3GPP TS 36.300 V9.7.0. Mar. 2011. 3GPP, Sophia Antipolis, France.

3GPP. "Technical Specification Group Radio Access Network; Evolved Universal Terrestrial Radio Access (E-UTRA); Physical Channels and Modulation (Release 10)" 3GPP TS 36.211. V10.1.0. Mar. 2011. 3GPP, Sophia Antipolis, France.

3GPP. "Technical Specification Group Radio Access Network; Evolved Universal Terrestrial Radio Access Network(E-UTRAN); Self-configuring and self-optimizing network (SON) use cases and solutions (Release 9)." 3GPP TR 36.902 V9.3.1. Mar. 2011. 3GPP, Sophia Antipolis, France.

3GPP. "Technical Specification Group Radio Access Network; Evolved Universal Terrestrial Radio Access Network (E-UTRAN); S1 Application Protocol (S1AP) (Release 9)." 3GPP TS 36.413 V9.6.1. May 2011. 3GPP, Sophia Antipolis, France.

3GPP. "Technical Specification Group Radio Access Network; Evolved Universal Terrestrial Radio Access Network (E-UTRAN); X2 layer 1 (Release 9)" 3GPP TS 36.421 V9.0.2. Mar. 2011. 3GPP, Sophia Antipolis, France.

3GPP. "Technical Specification Group Radio Access Network; Evolved Universal Terrestrial Radio Access Network (E-UTRAN); X2 signalling transport (Release 9)" 3GPP TS 36.422 V9.1.1. Mar. 2011. 3GPP, Sophia Antipolis, France.

3GPP. "Technical Specification Group Radio Access Network; Evolved Universal Terrestrial Radio Access Network (E-UTRAN); X2 application protocol (X2AP) (Release 9)" 3GPP TS 36.423 V9.6.0. Mar. 2011. 3GPP, Sophia Antipolis, France.

3GPP. "Technical Specification Group Radio Access Network; Evolved Universal Terrestrial Radio Access (E-UTRA); Radio Resource Control (RRC); Protocol specification (Release 10)." 3GPP TS 36.331 V10.1.0 Mar. 2011. 3GPP, Sophia Antipolis, France.

* cited by examiner

HANDOVER AND NEIGHBOR MANAGEMENT FOR MOBILE RELAY NODES

RELATED APPLICATIONS

This application claims priority under 35 U.S.C. §119(e) from U.S. Provisional Patent Application Ser. No. 61/486,027, which was filed on 13 May 2011, was entitled "Optimized Handover and Neighbor Management for Mobile Relays."

TECHNICAL FIELD

The present invention generally relates to managing neighbor cell information for mobile relay nodes, and particularly relates to providing complete, valid, and pertinent neighbor cell information to a mobile relay node as that node moves in a wireless communication system.

BACKGROUND

The 3rd-Generation Partnership Project (3GPP) is standardizing the Long Term Evolution (LTE) Advanced radio access technology. Cells are identified in an LTE-Advanced system, at least in part, using a Physical Cell Identity (PCI) that is not globally unique in the system. In fact, only 504 different Pas exist in the system. Limiting the number of Pas simplifies the cell searching process of user equipments (UEs), but inevitably leads to reuse of the same Pas in different cells.

One complication that results from PCI reuse is termed PCI confusion. PCI confusion arises when a UE in a serving cell reports neighbor cell signal measurements to the serving base station (called the serving evolved NodeB, eNB, in LTE terminology). The UE associates reported signal measurements with the neighbor cells on which they have been performed by including the Pas of those neighbor cells in the report. If two of the neighbor cells have the same PCI, the report's association between signal measurements and neighbor cells is ambiguous. This proves particularly problematic in the case where the serving eNB uses those measurements for handover of the UE to one of the neighbor cells, because the serving eNB may inadvertently hand over the UE to the wrong neighbor cell and thereby cause radio link failure.

In an effort to avoid these problems, cells in the LTE-Advanced system are also identified by a globally unique identifier referred to as a Cell Global Identity (CGI). When PCI confusion occurs in a UE's measurement report, the serving eNB can instruct the UE to acquire the CGI of the problematic neighbor cell from system information broadcast by the cell. This CGI will resolve the PCI confusion at the serving eNB. However, the UE may have to briefly interrupt its transmissions in order to acquire the CGI.

eNBs in an LTE-Advanced system thus store neighbor cell information within so-called neighbor relation tables (NRTs). Each NRT includes, among other things, a mapping between a neighbor cell's PCI and CGI. If an eNB receives a measurement report that causes PCI confusion with respect to a neighbor cell for which the eNB has a stored NRT, the eNB can resolve the PCI confusion by referencing the NRT rather than by having the UE acquire the neighbor cell's CGI.

An eNB must also reference an NRT for certain types of signaling. Signaling between eNBs in an LTE-Advanced system. Signaling between eNBs via a Mobility Management Entity (MME), for example, requires identifying cells with their CGIs because the MME routes messages based on part of those CGIs. Further, handover messages sent over an X2 interface between eNBs (called X2 handover request messages), and handover messages sent over an S1 interface between an eNB and a MME (called S1 handover required messages), also require identifying cells with their CGIs. Still further, an eNB can use a target cell's CGI to recover the target eNB's IP address and establish an X2 interface to that target eNB.

A serving eNB automatically populates its NRTs by requesting reports from served UEs that are located at different spots near the coverage limits of the serving cell and that thereby border different neighboring cells. Upon such request, the served UEs decode and report the CGIs of the different neighboring cells. This so-called UE Automatic Neighbor Relations (ANR) process takes considerable time in order to acquire the CGIs of all neighboring cells.

The fact that the UE ANR process takes time introduces complexities to systems that utilize relay nodes (RNs). From a radio propagation perspective, a relay node (RN) is positioned between a donor eNB and one or more UEs. An RN connects to the donor eNB using the same, standard radio link used by ordinary UEs. The RN then provides radio access to UEs, effectively emulating an eNB from the perspective of the UEs, and uses its radio link to the donor eNB as backhaul transport for UE data. As part of this emulation process, a cell provided by an RN (i.e., an RN cell) appears to a UE as a separate cell that is distinct from the cell provided by the donor eNB (i.e., the donor cell). An RN cell, for example, has its own PCI. An RN may also maintain and populate its own NRTs in a manner similar to that for eNBs.

Heretofore, RNs have remained statically fixed in a particular location, just like eNBs, so the delay involved in populating the NRTs using UE ANR has not introduced new challenges. However, new challenges are in fact introduced by recent proposals to mobilize RNs so that they effectively roam about the system like UEs.

Specifically, mobile RNs are to be installed on or inside of trains, buses, and other moving vehicles. UEs travelling in such a vehicle connect to the mobile RN rather than an eNB. Accordingly, instead of having to handover from eNB to eNB as the vehicle moves, each UE can remain connected to the mobile RN. The only eNB-to-eNB handover that need take place is of the mobile RN, which can be accomplished in a manner similar to that of UEs. Handover of just the mobile RN, rather than multiple individual UEs, optimizes radio signaling and reduces handover failures.

However, the transitory nature of a mobile RN inherently limits the amount of time that the RN has to populate its NRTs using UE ANR, since the mobile RN's neighbor cells vary as the RN moves. If the mobile RN does not have enough time to complete its NRTs, a likely scenario in many use cases, the RN will have to request that a UE read a neighboring cell's CGI in order to resolve PCI confusion from a UE's measurement report. In addition to the disadvantages mentioned above, that in turn delays any handover of the UE that may be made based on the report, such as a handover from the mobile RN to an eNB once the UE's user disembarks from the vehicle to which the mobile RN is attached. Such delay is particularly unacceptable in this context because the radio link between the UE and the mobile RN may deteriorate quickly once the vehicle moves away from the UE.

SUMMARY

One or more embodiments herein advantageously provide a mobile RN with complete and valid neighbor cell information, e.g., for facilitating handover of mobile terminals to or from that RN. One or more other embodiments herein compensate for a mobile RN's incomplete or invalid neighbor cell information.

Neighbor cell information generally refers to information about cells that neighbor the current donor cell to which the mobile RN is connected. Since at least some of the cells that neighbor the current donor cell also neighbor the mobile cell, neighbor cell information also includes information that more specifically pertains to cells that neighbor the mobile cell.

Processing performed by a mobile RN for realization of those former embodiments that provide the mobile RN 16 with complete and valid neighbor cell information include detecting the occurrence of a defined condition which characteristically indicates that movement of the mobile RN has rendered previously obtained neighbor cell information incomplete or invalid. Responsive to detecting the occurrence of that defined condition, processing further includes sending a request for neighbor cell information to a donor base station. Finally, processing includes receiving the requested neighbor cell information responsive to the request.

Different embodiments herein define the above condition for requesting neighbor cell information in different ways. Some embodiments define the condition in terms of actual movement of the mobile RN, e.g., handover, based on the presumption that such movement will have rendered previously obtained neighbor cell information incomplete or invalid. Other embodiments define the condition in terms of elapsed time, based on the presumption that the mobile RN will usually have moved enough during that time to render its neighbor cell information incomplete or invalid. Still other embodiments define the condition in terms of the incompleteness of the mobile RN's neighbor cell information, based on the presumption that such incompleteness depends on the movement of the mobile RN.

In the interest of minimizing unproductive control signaling, some embodiments herein advantageously recognize that not all of a donor base station's neighbor cell information may be relevant to the mobile RN, e.g., for handover decisions made by the mobile RN. Accordingly, such embodiments provide the mobile RN with neighbor cell information that strictly pertains to cells that neighbor the mobile cell.

To this end, the mobile RN in various embodiments herein generates its request for neighbor cell information to include identifiers for one or more cells currently neighboring the mobile cell. Based on these identifiers, the donor base station effectively filters the neighbor cell information that it provides to the mobile RN in response so that the information more specifically pertains to the mobile cell's neighbors, rather than generally pertaining to the donor cell's neighbors.

Processing performed at a donor base station for selectively providing relevant neighbor cell information to the mobile RN thus includes receiving identifying information that identifies one or more cells currently neighboring the mobile cell. Processing then includes selecting from a set of neighbor cell information stored at the donor base station a subset of information which pertains to the one or more identified cells. Finally, processing includes transmitting the selected subset of neighbor cell information, for providing that subset to the mobile RN.

This subset selection processing may be performed by either a source or a target donor base station involved in handover of the mobile RN. When performed by a target donor base station, processing at the source donor base station may entail receiving the identifying information that identifies the one or more cells currently neighboring the mobile cell. Processing then includes determining to hand over the mobile RN to the target donor base station. Responsive to that determination, processing includes sending a handover message to the target donor base station that includes the identifying information.

Rather than ensuring that the mobile RN has complete and valid neighbor cell information, other embodiments compensate for the mobile RN's lack of complete and valid neighbor cell information. In these embodiments, a mobile RN's neighbor cell information is incomplete whenever it lacks the unique cell identifier of at least one cell for which it has a non-unique cell identifier. This incompleteness poses problems when the mobile RN attempts to hand over a served mobile terminal to a target neighbor cell, since conventional systems require the mobile RN to identify that target cell in a handover message with the cell's unique identifier.

Broadly described, the embodiments that address this problem permit the mobile RN to identify a target cell with the cell's non-unique identifier in a handover message sent to the donor base station. The donor base station resolves this non-unique identifier and replaces it with the target cell's unique identifier for sending of the handover message towards the target cell.

Processing at the mobile RN more particularly includes determining to hand over a served mobile terminal to a target cell identified by a non-unique identifier. Processing then includes, responsive to recognizing that a mapping at the mobile RN does not map the non-unique cell identifier of the target cell to a corresponding unique cell identifier, generating a handover message for initiating the handover to include the non-unique cell identifier of the target cell. Finally, processing includes sending the generated handover message towards the target cell, via a donor base station that is configured to resolve non-unique cell identifiers.

Processing at the donor base station correspondingly includes resolving the non-unique cell identifier of the target cell by retrieving the corresponding unique cell identifier from a mapping of non-unique cell identifiers to unique cell identifiers. Processing further includes modifying the handover message by replacing the non-unique cell identifier in the message with the retrieved unique cell identifier. Finally, processing includes forwarding the modified handover message towards the target cell for initiating the handover.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
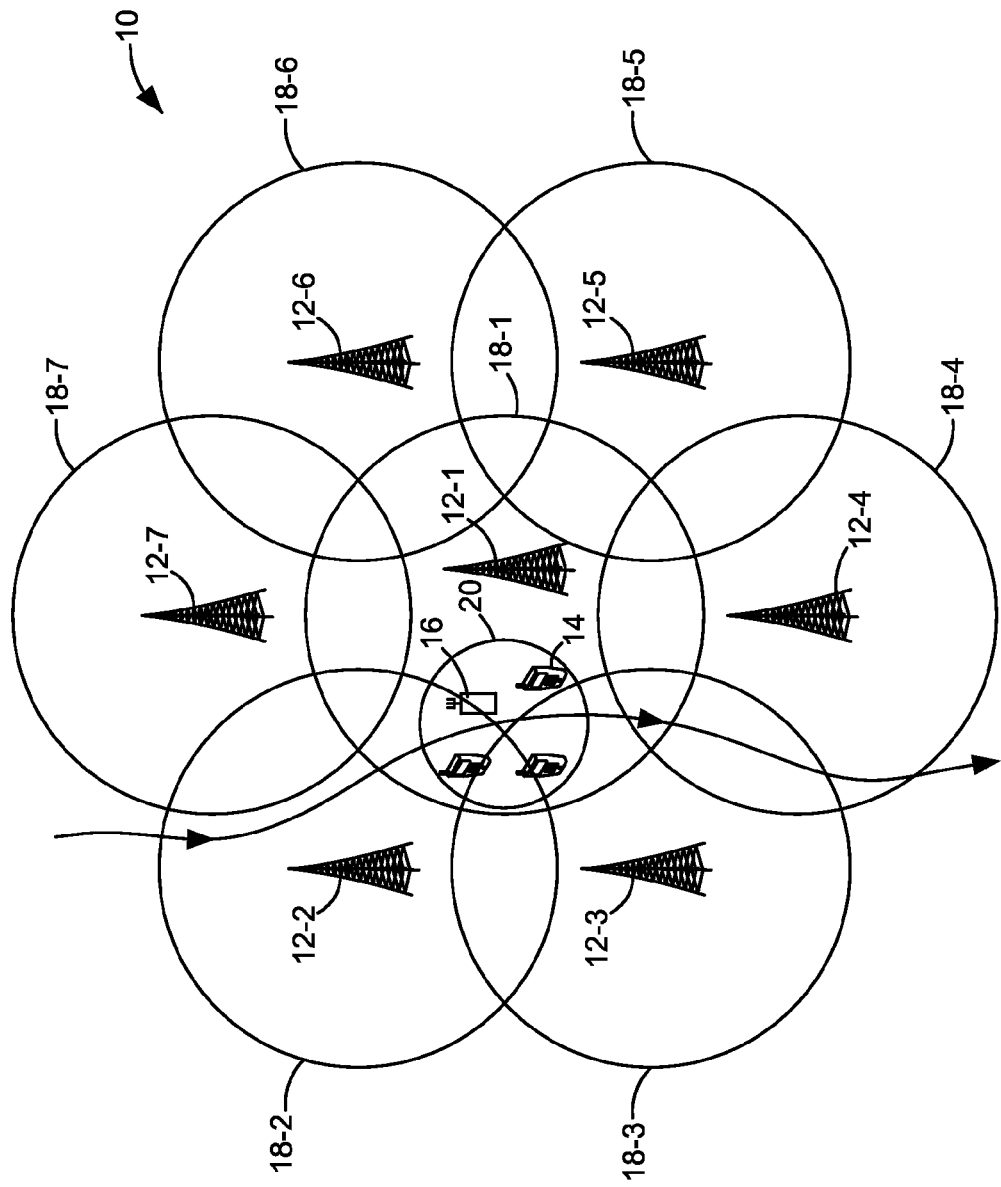
FIG. 1 is a block diagram of a wireless communication system that includes a mobile relay node and one or more donor base stations configured according to one or more embodiments.

FIG. 1 depicts a wireless communication system 10 configured to support mobile relay services. The system 10 includes a plurality of base stations 12, one or more mobile terminals 14, and a mobile relay node (RN) 16.

Each base station 12 serves one or more 'fixed' cells 18, at least in the sense that each base station 12 remains fixed at the same geographic location. Conversely, the mobile RN 16 serves its own 'mobile' cell 20, which moves with the mobile RN 16.

In that regard, the mobile RN 16 connects to one of the base stations 12 (referred to as a donor base station) using the same, standard radio link used by terminals 14. The mobile RN 16 then provides radio access to those mobile terminals 14 within the coverage area of the mobile cell 20, effectively emulating a base station 12, and uses its radio link to the donor base station as backhaul transport for terminal data. The mobile RN 16 thereby relays communications between the donor base station and mobile terminals 14.

As the mobile RN 16 moves about the system 10, mobile terminals 14 that remain in the coverage area of the mobile cell 20 remain stably connected to the mobile RN 16. The mobile RN 16, by contrast, hands over from donor base station to donor base station (i.e., from donor cell to donor cell). The current donor base station of the mobile RN 16 thus changes as the mobile RN 16 moves, as does the cells 18 that currently neighbor the mobile RN 16.

One or more embodiments herein advantageously provide the mobile RN 16 with complete and valid neighbor cell information, e.g., for facilitating handover of mobile terminals 14 between the mobile cell 20 and neighboring cells 18. Neighbor cell information generally refers to information about cells 18 that neighbor the current donor cell to which the mobile RN 16 is connected. Since at least some of the cells 18 that neighbor the current donor cell also neighbor the mobile cell 20, neighbor cell information also includes information that more specifically pertains to cells 18 that neighbor the mobile cell 20. Regardless, one or more other embodiments herein advantageously compensate for the mobile RN's incomplete or invalid neighbor cell information.

Figure 2:
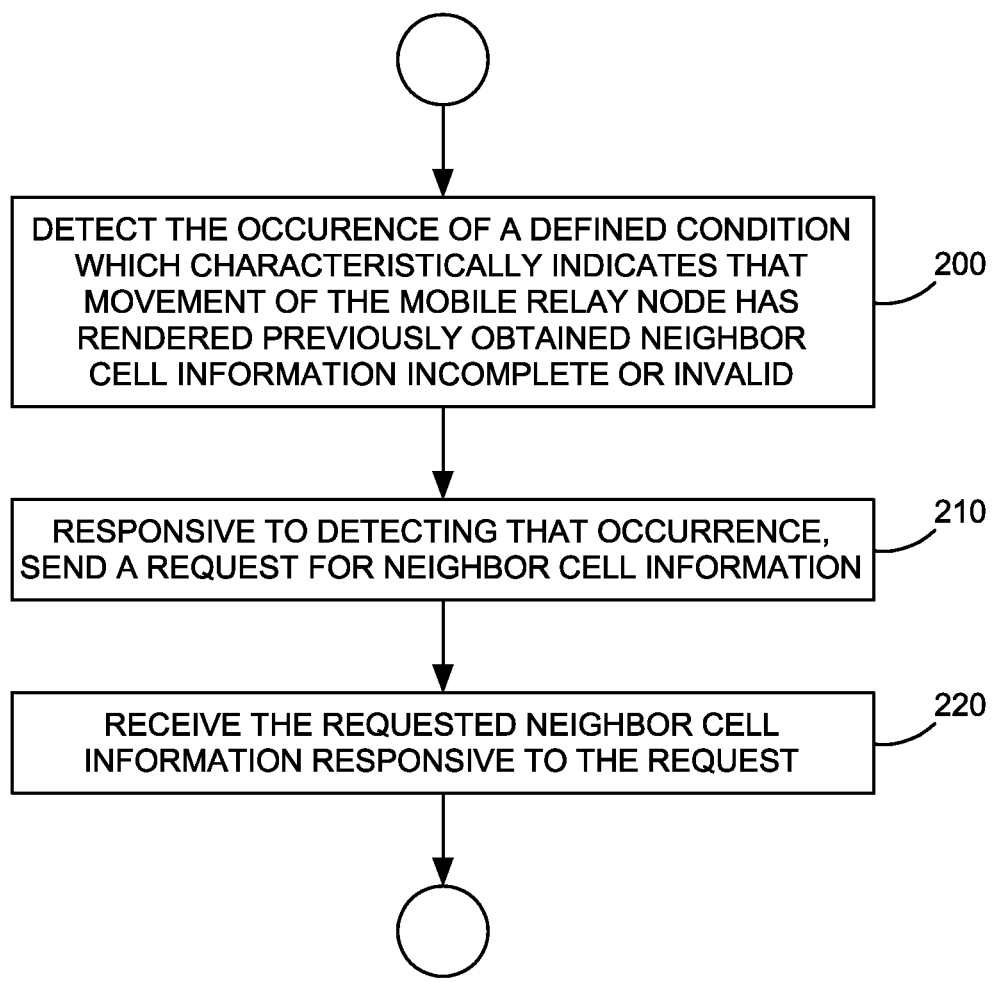
FIG. 2 is a logic flow diagram of a method implemented by a mobile relay node for maintaining neighbor cell information according to one or more embodiments.

FIG. 2 illustrates processing performed by the mobile RN 16 for realization of those former embodiments that provide the mobile RN 16 with complete and valid neighbor cell information. As shown in FIG. 2, processing at the mobile RN 16 includes detecting the occurrence of a defined condition which characteristically indicates that movement of the mobile RN 16 has rendered previously obtained neighbor cell information incomplete or invalid (Block 200). Responsive to detecting the occurrence of that defined condition, processing further includes sending a request for neighbor cell information to a donor base station (Block 210). Finally, processing includes receiving the requested neighbor cell information responsive to the request (Block 220).

Different embodiments herein define the above condition for requesting neighbor cell information in different ways. Some embodiments define the condition in terms of actual movement of the mobile RN 16, based on the presumption that such movement will have rendered previously obtained neighbor cell information incomplete or invalid. Other embodiments define the condition in terms of elapsed time, based on the presumption that the mobile RN 16 will usually have moved enough during that time to render its neighbor cell information incomplete or invalid. Still other embodiments define the condition in terms of the incompleteness of the mobile RN's neighbor cell information, based on the presumption that such incompleteness depends on the movement of the mobile RN 16. Regardless of the particular way in which the condition is defined, therefore, detection of the condition characteristically indicates that movement of the mobile relay node has rendered previously obtained neighbor cell information incomplete or invalid.

Figure 3:
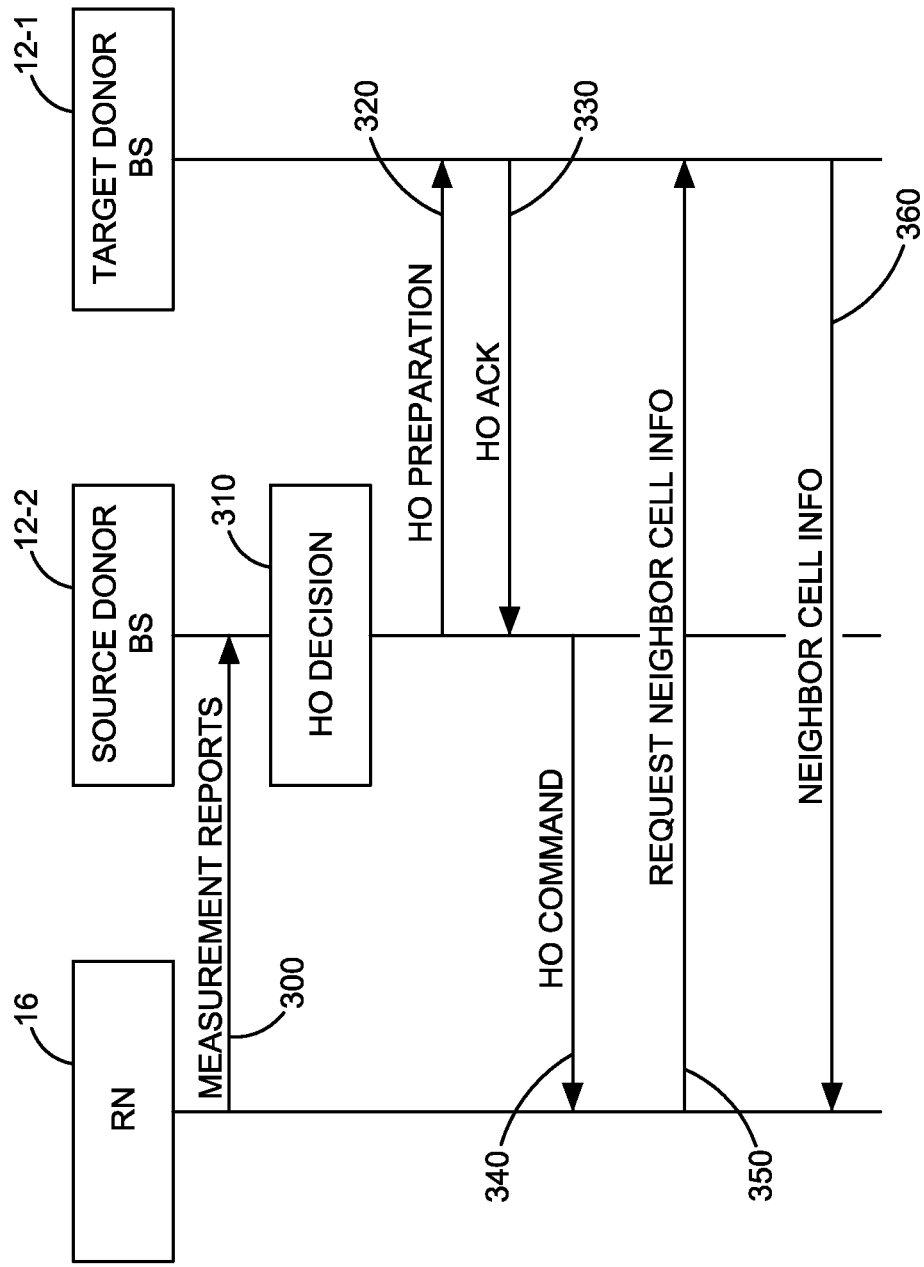
FIG. 3 is a signaling diagram that illustrates signaling between a mobile relay node, a source donor base station, and a target donor base station according to one or more embodiments.

Consider embodiments that define the condition in terms of movement of the mobile RN 16. In at least one of these embodiments, the condition is defined to be the mobile RN 16 moving from one defined geographic area to another. Such geographic areas may be defined for instance as particular groups of base stations 12 or cells 18, which characteristically have different neighbor cells. In at least one other embodiment, the condition is defined to be the mobile RN 16 being handed over from one donor base station to another. In this case, the mobile RN 16 dynamically detects the occurrence of handover from a source donor base station (e.g., base station 12-2) to a target donor base station (e.g., base station 12-1), and sends the request for neighbor cell information responsive to that occurrence. In some embodiments, the mobile RN 16 sends the request to the source donor base station 12-2, while in other embodiments the mobile RN 16 sends the request to the target donor base station 12-1. FIG. 3 illustrates a simple example of these latter embodiments.

As shown in FIG. 3, the mobile RN 16 sends a measurement report to the source donor base station 12-2 that includes signal measurements for the current donor cell 18-2 and one or more cells 18 that currently neighbor the mobile cell 20 as potential donor cell targets (Step 300). Based on the signal measurements in the report, the source donor base station 12-2 targets one of the reported cells 18 for receiving the mobile RN 16 in handover as the mobile RN's new donor base station (Step 310). In this example, the source donor base station 12-2 targets base station 12-1 for handover. Accordingly, the source donor base station 12-2 sends a handover preparation message to the target donor base station 12-1 (Step 320). Responsive to the target donor base station 12-1 acknowledging or otherwise accepting handover of the mobile RN 16 (Step 330), the source donor base station 12-2 sends a handover command message to the mobile RN 16 (Step 340).

This handover command message directs the mobile RN 16 to hand itself over to the target donor base station 12-1. The mobile RN 16 detects receipt of this handover command message as the defined condition characteristically indicating movement has rendered neighbor cell information incomplete or invalid. Indeed, in this example, the mobile RN 16 has previously obtained neighbor cell information that generally indicates information about cells 18 that neighbor the source donor base station 12-2 (e.g., information about cells 18-3, 18-1, 18-7, and others not shown in FIG. 1). Handover to a new donor base station, namely the target donor base station 12-1, means that this neighbor cell information is no longer complete or valid for the mobile RN 16. Accordingly, the mobile RN 16 sends a request to the target donor base station 12-1 for neighbor cell information that generally indicates information about cells 18 neighboring that base station 12-1 (e.g., information about cells 18-1, 18-2, . . . 18-7) (Step 350). Finally, the mobile RN 16 receives the requested neighbor cell information responsive to the request (Step 360).

Consider next embodiments that define the condition for requesting neighbor cell information from the donor base station in terms of elapsed time. In at least one of these embodiments, the condition is defined to be the elapse of a defined amount of time since the mobile RN 16 previously obtained neighbor cell information. This embodiment operates on the presumption that the mobile RN 16 will usually move enough during the elapsed time interval in order for its neighbor cell information to become stale. Expiration of the defined time interval thus does not necessarily guarantee that the mobile RN's neighbor cell information has become incomplete or invalid, or even that the mobile RN 16 has in fact moved; but, such expiration does indicate that both have probably occurred.

Of course, the likelihood of the mobile RN 16 moving enough to render its neighbor cell information incomplete or invalid varies with the speed at which the mobile RN 16 moves. In at least some embodiments, therefore, the mobile RN 16 dynamically adapts the defined amount of time that must elapse before requesting neighbor cell information in a way that is proportional to the current speed of the mobile RN 16. For example, the defined amount of time that must elapse may be dynamically increased or decreased based on whether the mobile RN 16 is currently moving slower or faster, respectively.

Consider finally embodiments that define the condition for requesting neighbor cell information from the donor base station in terms of the incompleteness of the mobile RN's previously obtained neighbor cell information. Different ones of these embodiments condition the request for neighbor cell information on different degrees to which the previously obtained information has become incomplete. In doing so, such embodiments strike different balances between promptly completing the mobile RN's neighbor cell information and reducing control signaling.

In more detail, cells 18 in these embodiments are identified by two different identifiers, namely a non-unique cell identifier that is not unique within the system 10 and a unique cell identifier that is unique within the system 10. Where the system 10 is an LTE-Advanced system, for instance, these identifiers include a Physical Cell Identity (PCI) and a Cell Global Identity (CGI). The two identifiers may be mapped to one another in a neighbor relation table (NRT).

Regardless, a mobile RN's neighbor cell information is incomplete whenever it lacks the unique cell identifier of at least one cell 18 for which it has a non-unique cell identifier. This can happen because the mobile RN 16 can more readily obtain non-unique cell identifiers than unique cell identifiers. The mobile RN 16 may, for instance, autonomously obtain one or more non-unique cell identifiers by detecting those identifiers itself. Additionally or alternatively, the mobile RN 16 may receive unsolicited reports from served mobile terminals 14 that include one or more non-unique cell identifiers detected by those terminals 14.

According to at least one embodiment, the condition for requesting neighbor cell information from the donor base station is defined to be the mobile RN 16 obtaining a certain number of non-unique cell identifiers for which it does not have corresponding unique cell identifiers. Presumably, the mobile RN 16 obtains these 'new' non-unique cell identifiers as it moves to an area that has new neighbor cells. Regardless, the donor base station responds to such a request (which, as explained below, may or may not include the obtained non-unique cell identifiers) with neighbor cell information that includes the unique cell identifiers missing at the mobile RN 16. Increasing the number of non-unique cell identifiers required by the condition decreases the promptness with which the mobile RN 16 completes its neighbor cell information, but also advantageously decreases the mobile RN's control signaling.

As an example, where the system 10 is an LTE-Advanced system, the mobile RN 16 may obtain a defined number of Pas detected by mobile terminals 14 for which the mobile RN 16 does not have corresponding CGIs. Rather than commanding the reporting terminals 14 to acquire those CGIs themselves, the mobile RN 16 sends a request to the donor base station for neighbor cell information. That neighbor cell information will include the missing CGIs.

The value of obtaining the unique cell identifiers mapped to already obtained non-unique cell identifiers nonetheless depends on the likelihood of the mobile RN 14 needing or using those unique cell identifiers. Such likelihood often turns on signal measurements that have been reported for the non-unique cell identifiers by a particular mobile terminal 14. For instance, a mobile terminal 14 in these embodiments sends a measurement report to the mobile RN 16 that includes one or more non-unique identifiers and one or more signal measurements for those identifiers. Based on a comparison of the signal measurements in the report, the mobile RN 16 determines whether or not to hand over the mobile terminal 14 to one of the cells 18 identified by a reported non-unique cell identifier. If the signal measurement for a cell 18 is quite low, as compared to for instance signal measurements of the mobile cell 20, the mobile RN 16 decides not to hand over the mobile terminal 14. Conversely, if the signal measurement for a cell 18 is quite high, the mobile RN 16 decides to target that cell 18 for hand over of the terminal 14. Especially if this target cell has the same non-unique identifier as another reported cell, the mobile RN 16 will need the target cell's unique identifier for directing the handover.

Accordingly, in at least one embodiment, the condition for requesting neighbor cell information from the donor base station is defined to be the mobile RN 16 obtaining a certain number of non-unique cell identifiers for which it does not have corresponding unique cell identifiers and for which signal measurements have been reported by a particular mobile terminal 14 that meet or exceed a predefined measurement threshold. Operating based on a condition defined in this way, the mobile RN 16 only requests neighbor cell information when it has obtained at least a minimum number of non-unique cell identifiers that are mapped to unique cell identifiers likely to be used or needed by the mobile RN 16, e.g., for handover of a particular mobile terminal 14. This conserves radio resources by reducing or minimizing unproductive control signaling.

The condition may nonetheless be defined to accommodate requesting of neighbor cell information, even if doing so amounts to excessive control signaling, provided that the requested information is "important" enough. For example, in some embodiments, the condition for requesting neighbor cell information is defined to be any given non-unique cell identifier being reported to the mobile RN 16 a defined number of times by different mobile terminals 14 served by the mobile RN 16. This way, the mobile RN 16 can request neighbor cell information as soon as possible if that information would pertain to such a highly reported (i.e., important) cell 18, even though doing so might cause more control signaling than if the request were delayed.

Further in the interest of minimizing unproductive control signaling, though, other embodiments herein advantageously recognize that not all of a donor base station's neighbor cell information may be relevant to the mobile RN 16, e.g., for handover decisions made by the mobile RN 16. More particularly, the neighbor cell information received from a donor base station has generally referred in the above embodiments to information about cells 18 that neighbor the donor base station's cell 18. So, in FIG. 1 for example, when the mobile RN 16 has received neighbor cell information from donor base station 12-1, the information has included information about cells 18-2, 18-3, . . . 18-7 that neighbor the donor cell 18-1. Yet not all of this information may be relevant to the mobile RN 16, because not all of the cells that neighbor the donor cell 18-1 also neighbor the mobile cell 20. Accordingly, some embodiments herein provide the mobile RN 16 with neighbor cell information that strictly pertains to cells 18 that neighbor the mobile cell 20. In FIG. 1, therefore, the mobile RN in these embodiments will receive neighbor cell information from donor base station 12-1 that only includes information about cells 18-2 and 18-3.

To this end, the mobile RN 16 in various embodiments herein generates its request for neighbor cell information to include identifiers for one or more cells 18 currently neighboring the mobile cell 20 (e.g., cells 18-2 and 18-3). Based on these identifiers, the donor base station 12-1 effectively filters the neighbor cell information that it provides to the mobile RN 16 in response so that the information more specifically pertains to the mobile cell's neighbors, rather than generally pertaining to the donor cell's neighbors.

The mobile RN 16 may certainly obtain the identifiers for cells 18 that neighbor its mobile cell 20 by detecting those identifiers itself. That is, much like a mobile terminal 14, the mobile RN 16 may detect signals transmitted by any neighboring cells 18 in order to determine the identifiers advertised via those signals. However, in at least some embodiments, the mobile RN 16 may also obtain the identifiers for cells 18 that neighbor its mobile cell 20 by receiving and inspecting measurement reports from served mobile terminals 14 that include those identifiers. The mobile RN 16 may thus generate its request for neighbor cell information to include the identifiers of any cells 18 detected by the mobile RN 16 itself as well as the identifiers of any cells 18 detected by served mobile terminals 14.

Regardless of how the mobile RN 16 obtains the identifiers, though, the mobile RN 16 in some embodiments selects for inclusion in the request only a subset of obtained identifiers as being those that pertain to cells 18 currently neighboring the mobile cell 20. For example, the mobile RN 16 in at least one embodiment selects from a set of obtained identifiers a subset of identifiers that have been obtained with a defined time period. The mobile RN 16 then includes that subset of identifiers in the request.

The time period dictating which identifiers are included in the request may be defined relative to the current time at the mobile RN 16 (e.g., include all identifiers obtained within the past hour). Moreover, the time period may be dynamically adapted proportional to the speed at which the mobile RN 16 is currently moving, since the mobile RN's neighbors will change at a rate that depends on the mobile RN's speed. In this case, the time period may be dynamically increased or decreased based on whether the mobile RN 16 is moving slower or faster, respectively. For instance, if the mobile RN 16 is only moving at 15 miles per hour, the time period may be increased to include all identifiers obtained within the past hour. But if the mobile RN 16 is moving at 45 miles per hour, the time period may be decreased to only include identifiers obtained within the past 30 minutes.

The identifiers available at the mobile RN 16 for inclusion in the request may be non-unique identifiers (e.g., PCIs), since those identifiers are readily obtainable. Accordingly, the mobile RN 16 in some embodiments generates the request to include non-unique identifiers for neighboring cells 18 (e.g., PCIs), and receives neighbor cell information from the donor base station in response that maps those non-unique identifiers to corresponding unique cell identifiers (e.g., CGIs).

Figure 4:
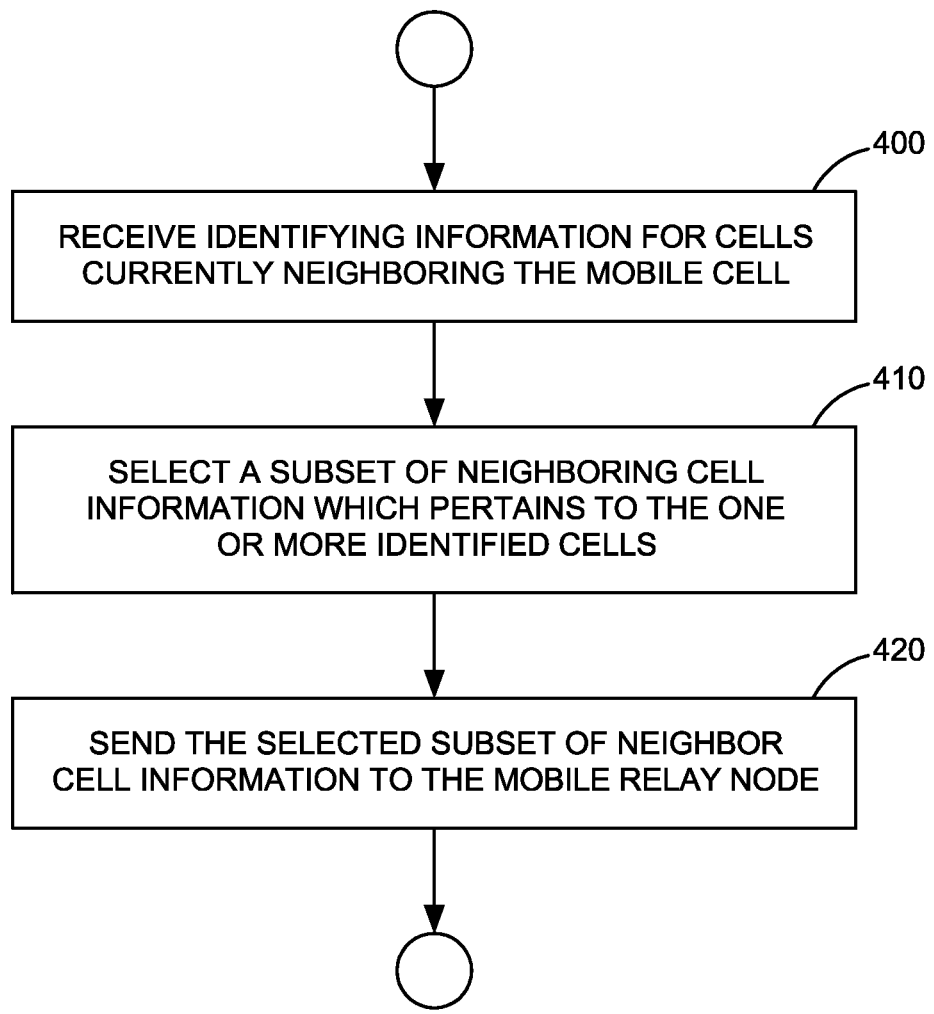
FIG. 4 is a logic flow diagram of a method implemented by a donor base station for providing neighbor cell information to a mobile relay node according to one or more embodiments.

Regardless, FIG. 4 illustrates corresponding processing performed at a donor base station (e.g., base station 12-1) for selectively providing relevant neighbor cell information to the mobile RN 16. As shown in FIG. 4, such processing includes receiving identifying information that identifies one or more cells 18 currently neighboring the mobile cell 20 (e.g., cells 12-2 and 12-3) (Block 400). Processing then includes selecting from a set of neighbor cell information stored at the donor base station a subset of information which pertains to the one or more identified cells 18 (Block 410). Finally, processing includes transmitting the selected subset of neighbor cell information, for providing that subset to the mobile RN 16 (Block 420).

More particularly, in some embodiments, the identifying information received at the donor base station includes non-unique cell identifiers for those cells 18 currently neighboring the mobile cell 20. The donor base station selects from a set of unique cell identifiers stored at the base station a subset of unique cell identifiers mapped to these received non-unique cell identifiers. The donor base station thereby provides the mobile RN 16 with unique cell identifiers for those cells 18 neighboring the mobile cell 20, while refraining from providing the mobile RN 16 with unique cell identifiers for those cells 18 that do not neighbor the mobile cell 20.

In some embodiments, the identifying information is received at the donor base station from the mobile RN 16. For instance, the donor base station may receive the identifying information within a request for neighbor cell information, or within measurement reports. In other embodiments, the identifying information is received at the donor base station from another base station 12. Whether the identifying information is received from the mobile RN 16 or another base station 12 may depend on which particular base station implements the above processing of FIG. 4.

Figure 5:
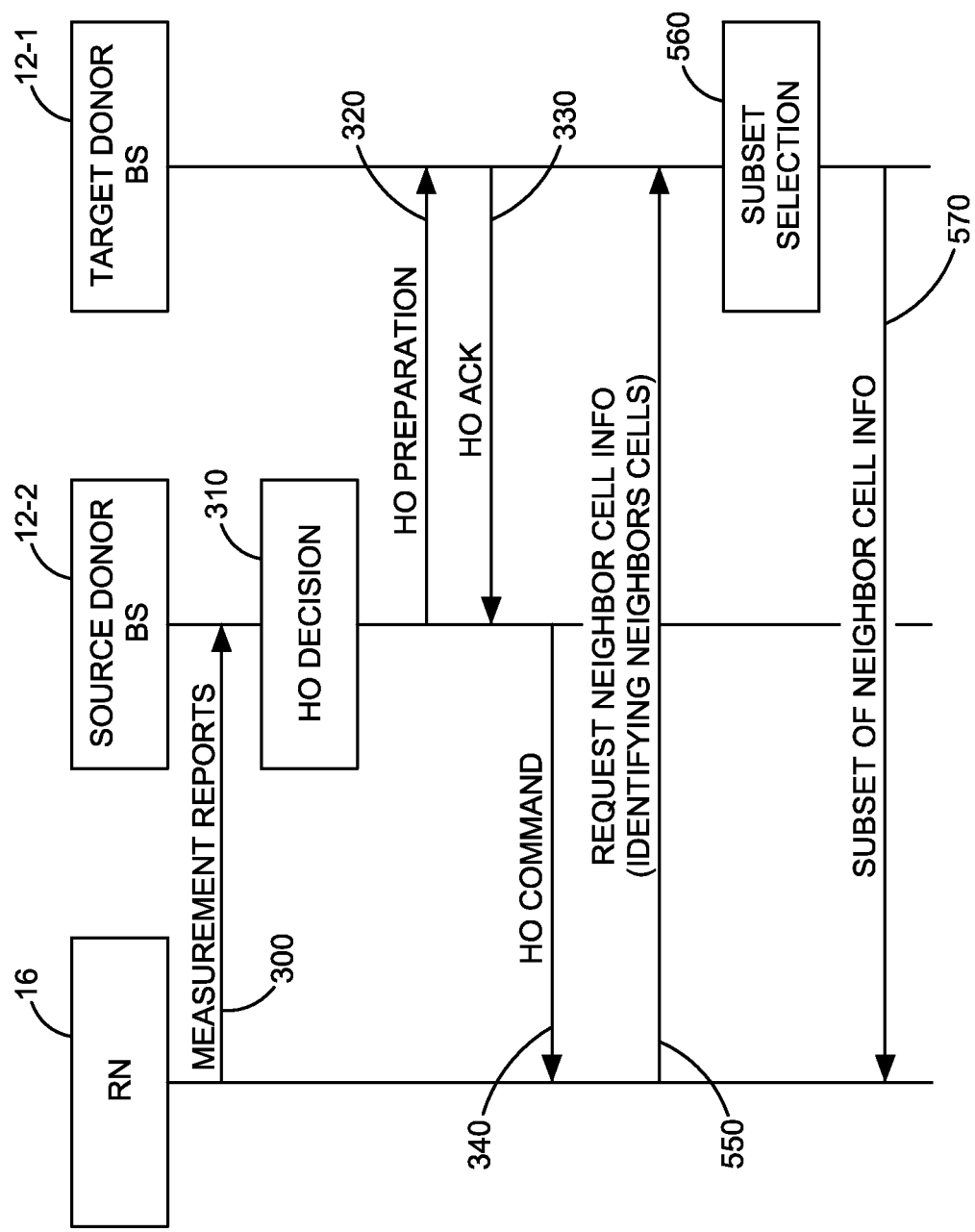
FIGS. 5-7 and 9 are signaling diagrams that illustrate signaling between a mobile relay node, a source donor base station, and a target donor base station according to different embodiments.
Figure 6:
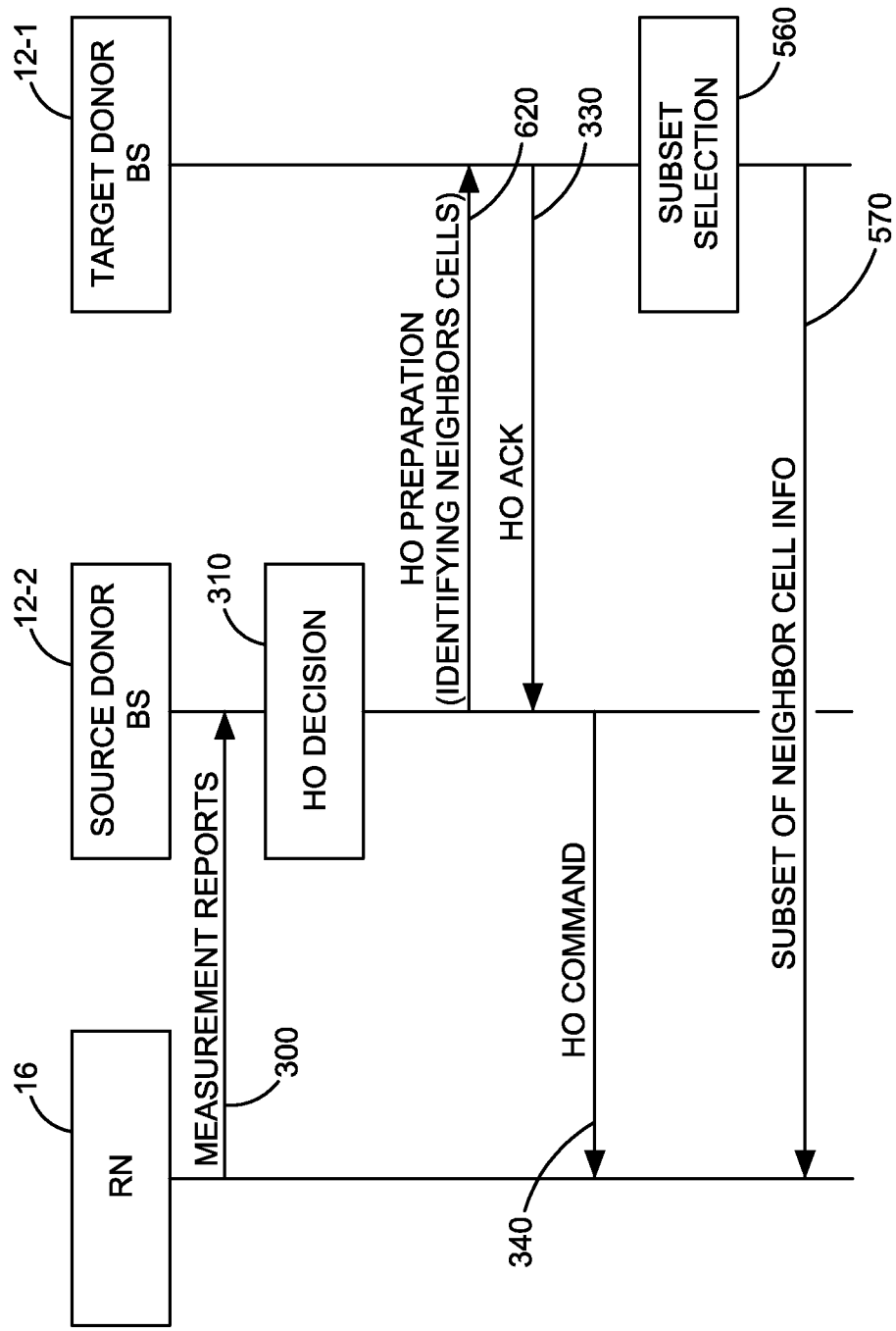
Figure 7:
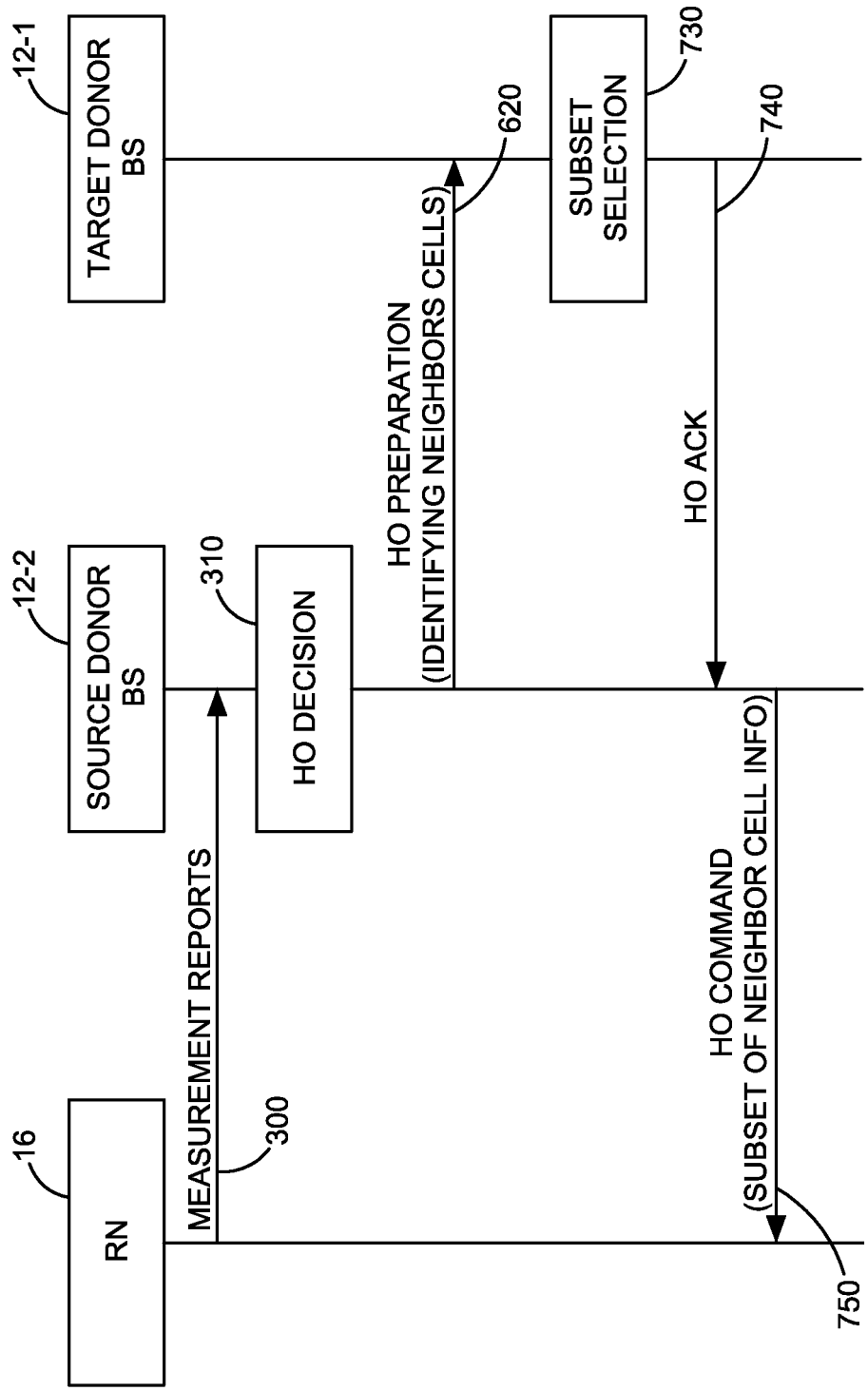
Figure 9:
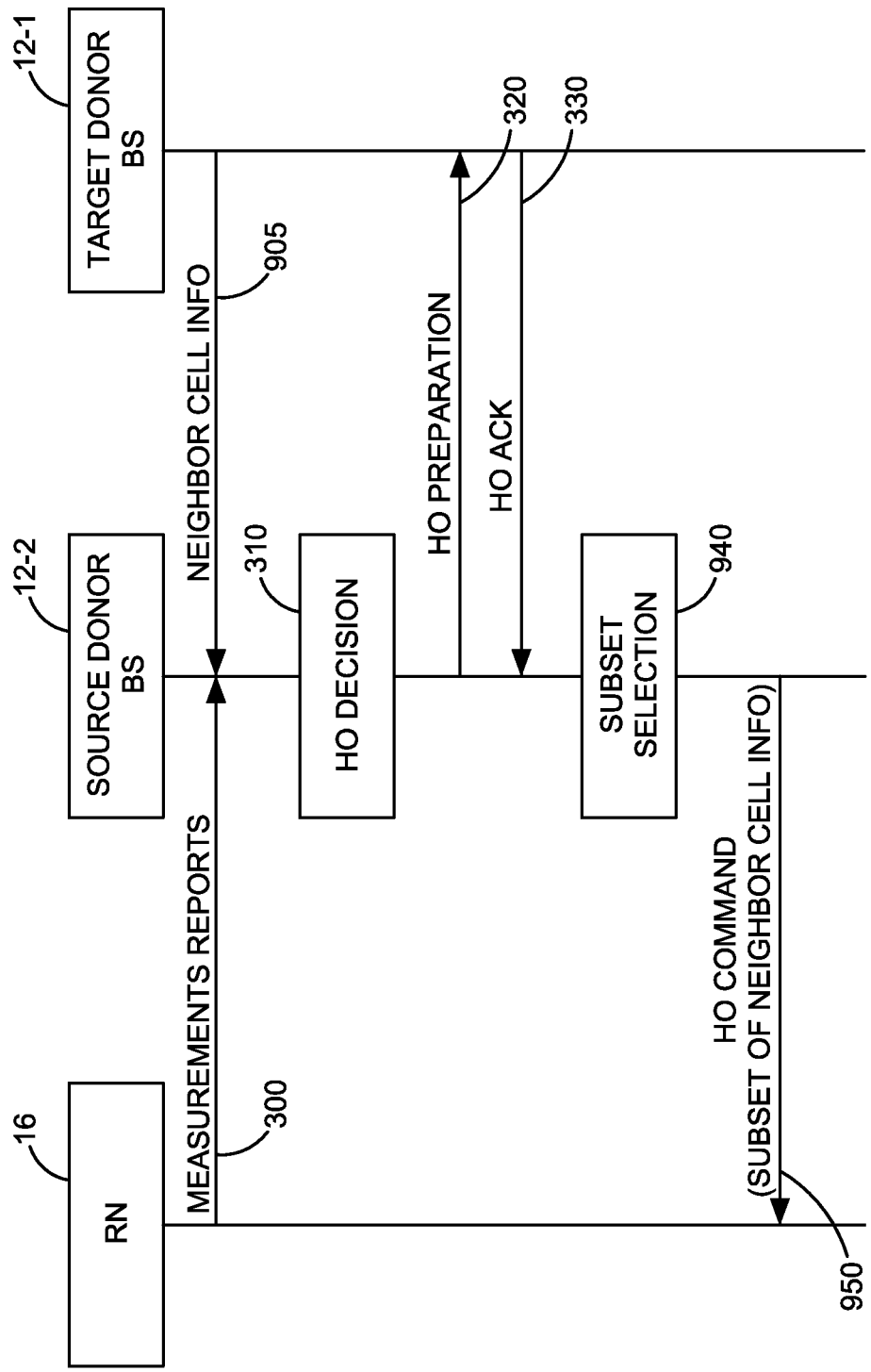

In this regard, the subset selection processing of FIG. 4 may be performed by either a source or a target donor base station involved in handover of the mobile RN 16. FIGS. 5-7 and 9 illustrate a number of different examples, with FIGS. 5-7 illustrating subset selection processing performed by a target donor base station 12-1 and FIG. 9 illustrating subset selection processing performed by the source donor base station 12-2.

The start of the handover process in FIG. 5 proceeds similarly to steps 300-340 shown in FIG. 3. But, when the mobile RN 16 sends a request to the target donor base station 12-1 for neighbor cell information, the mobile RN 16 includes the identifying information for its neighboring cells 18 in that request (Step 550). Responsive to receiving such request, the target donor base station 12-1 selects the subset of neighbor cell information that is pertinent to the mobile RN 16 (Step 560), and returns the selected subset (Step 570).

Figure 8:
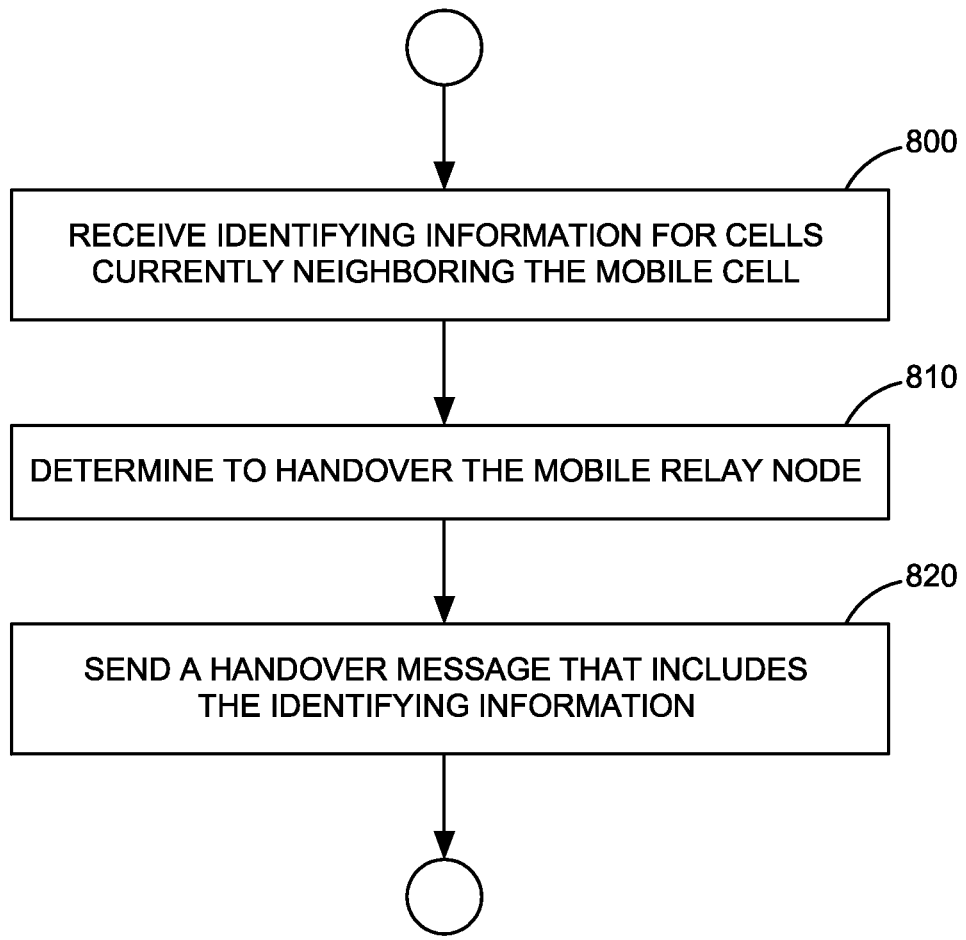
FIG. 8 is a logic flow diagram of a method implemented by a source donor base station for handing over a mobile relay node to a target donor base station according to one or more embodiments.

FIGS. 6 and 7 illustrate that the target donor base station 12-1 may receive the identifying information from the source donor base station 12-2, rather than from the mobile RN 16 as in FIG. 5. Indeed, the source donor base station 12-2 in these embodiments generally performs the processing shown in FIG. 8 for providing the identifying information to the target donor base station 12-1. As depicted in FIG. 8, processing at the source donor base station 12-2 includes receiving the identifying information that identifies the one or more cells 18 currently neighboring the mobile cell 20 (Block 800). Such may entail, for instance, receiving the identifying information from the mobile RN 16 within measurement reports (i.e., in Step 300 of FIGS. 6 and 7). Regardless, processing then includes determining to hand over the mobile RN 16 to the target donor base station 12-1 (Block 810), e.g., based on received measurement reports at Step 310 of FIGS. 6 and 7. Responsive to that determination, processing includes sending a handover message to the target donor base station 12-1 that includes the identifying information (Block 820). Such handover message may be, for instance, the handover preparation message sent in Step 620 of FIGS. 6 and 7.

The target donor base station 12-1 extracts the identifying information from the handover message received from the source donor base station 12-2. The target donor base station 12-1 may then select and send the subset of neighbor cell information to the mobile RN 16 at different times, as shown by the differences in FIGS. 6 and 7. In FIG. 6, the target donor base station 12-1 autonomously selects and sends the subset of neighbor cell information directly to the mobile RN 16 responsive to completion of the handover procedure (Steps 560 and 570). In FIG. 7, by contrast, the target donor base station 12-1 autonomously selects and sends the subset of neighbor cell information as part of the handover procedure. Specifically, the target donor base station 12-1 selects the subset responsive to receiving a handover preparation message from the source donor base station 12-2 that includes the identifying information (Step 730), and then transmits the selected subset to the source donor base station 12-2 within the handover acknowledgement message (Step 740). The source donor base station 12-2 then relays that selected subset to the mobile RN 16 within the handover command message (Step 750).

FIG. 9 now illustrates additional details of embodiments where subset selection processing is performed by the source donor base station 12-2. In these embodiments, the source donor base station 12-2 receives from the mobile RN 16, within measurement reports, identifying information that identifies one or more cells currently neighboring the mobile cell 20 (Step 300). Moreover, the source donor base station 12-2 receives from the target donor base station 12-1, over a base station to base station interface (e.g., X2), a set of neighbor cell information that pertains to cells 18 neighboring the target cell 18-1 (Step 905). Then, after the target donor base station 12-1 acknowledges handover (Step 330), the source donor base station 12-2 selects from the set of neighbor cell information received from the target donor base station 12-1 a subset of that information which specifically pertains to the one or more identified cells (Block 940). Finally, the source base station 12-2 transmits the selected subset to the mobile RN 16 within the handover command message (Step 950).

Those skilled in the art will of course appreciate that FIGS. 3, 5-7, and 9 just represented particular examples of embodiments that provide neighbor cell information to the mobile RN 16 in the context of handover. Other embodiments not depicted may be formed from combinations of those examples. For instance, the source donor base station 12-2 in FIG. 9 may send a handover command to the mobile RN 16 that includes the complete set of the target donor base station's neighbor cell information (as in FIG. 3), rather than only a subset.

Those skilled in the art will also understand that different types of messages may be used to request and convey neighbor cell information (whether that information generally pertains to cells 18 that neighbor a donor cell, or more specifically pertains to cells 18 that neighbor the mobile cell 20) depending on the particular type of the system 10. Consider for instance embodiments where the system 10 is an LTE-Advanced system. The mobile RN 16 may send a request for neighbor cell information to a donor base station as an X2 Setup Request message, e.g., apart from or at the completion of a handover process as in FIG. 3. Likewise, a donor base station may send neighbor cell information to the mobile RN 16 within an X2 Setup Response message, either in response to an X2 Setup Request (as in FIGS. 3 and 5) or autonomously (as in FIG. 6). Alternatively, a donor base station may send neighbor cell information to the mobile RN 16 within an RRCConnectionReconfiguration message that operates as the handover command message in FIGS. 7 and 9. Specifically, the neighbor cell information may be included in a mobilityControlInfo Information Element (IE) that is part of a RRCConnectionReconfiguration message.

Those skilled in the art will further appreciate that the above description may have been simplified in a number of respects purely for explanatory purposes. As one example of this, neighbor cell information for any given cell has primarily been described as including a mapping between the cell's non-unique identifier (e.g., PCI) and the cell's unique identifier (e.g., CGI). However, the neighbor cell information may include other information as well, including for instance the "No remove," "No handover," and "No X2 connection" flags of an NRT in LTE-Advanced embodiments.

As another example of this simplification, the above description has omitted signaling optimizations that are possible when the mobile RN 16 moves along a repetitive route, such as in a public transportation system. Instead of repeatedly signaling the same neighbor cell information to the mobile RN 16 each time the mobile RN 16 hands over to a particular donor base station 18, some embodiments herein only send the mobile RN 18 updates to the neighbor cell information. The intelligence responsible for this signaling optimization may reside in the mobile RN 16 and/or a donor base station 18.

In embodiments wherein the intelligence resides in the mobile RN 16, the mobile RN 16 tracks the cells 18 for which it has already received neighbor cell information from a particular donor base station 18. Then, when the mobile RN 16 later hands over to that donor base station 18, it selectively requests neighbor cell information for only those currently detected neighbor cells for which it has not previously received information.

For example, in at least one embodiment, the mobile RN 16 stores neighbor cell information that it receives from a donor base station 18 and associates that information with the donor base station 18 in a mapping table. Then, responsive to subsequent handover to that donor base station 18, the mobile RN 18 reverts to the neighbor cell information that it has stored and associated with the donor base station 18. If any currently detected neighbor cells are not addressed in that stored neighbor cell information, the mobile RN 16 selectively requests neighbor cell information from the donor base station 18 for only those cells 18.

By contrast, in embodiments wherein the intelligence resides in the donor base station 18, the base station tracks the cells 18 for which it has already sent neighbor cell information to a particular mobile RN 16. Then, when that mobile RN 16 later hands over to the donor base station 18, it selectively pushes only updates to the information for those cells 18.

Thus, in at least one embodiment, a donor base station 18 stores a subset of neighbor cell information that it has selected for a particular mobile RN 16 and associates that subset with the mobile RN 17 in a mapping table. Meanwhile, the donor base station 18 updates any neighbor cell information in the stored subset responsive to receiving a notification that such information has changed. This may occur if, for instance, a base station 18 providing one of those neighbor cells restarts and acquires a different non-unique identifier. Regardless, responsive to subsequent handover of the mobile RN 16 to the donor base station 18, the base station 18 selectively sends the mobile RN 16 updates to the stored subset.

Rather than ensuring that the mobile RN 16 has complete and valid neighbor cell information, embodiments will now be described that compensate for the mobile RN's lack of complete and valid neighbor cell information. As in various embodiments above, a mobile RN's neighbor cell information in these embodiments is incomplete whenever it lacks the unique cell identifier of at least one cell 18 for which it has a non-unique cell identifier. This incompleteness poses problems when the mobile RN 16 attempts to hand over a served mobile terminal 14 to a target neighbor cell 18, since conventional systems require the mobile RN 16 to identify that target cell in a handover message with the cell's unique identifier. Indeed, in conventional LTE-Advanced systems, handover messages sent over an X2 interface between eNBs (called X2 handover request messages), and handover messages sent over an S1 interface between an eNB and a MME (called S1 handover required messages), require identifying target cells with their CGIs.

Figure 10:
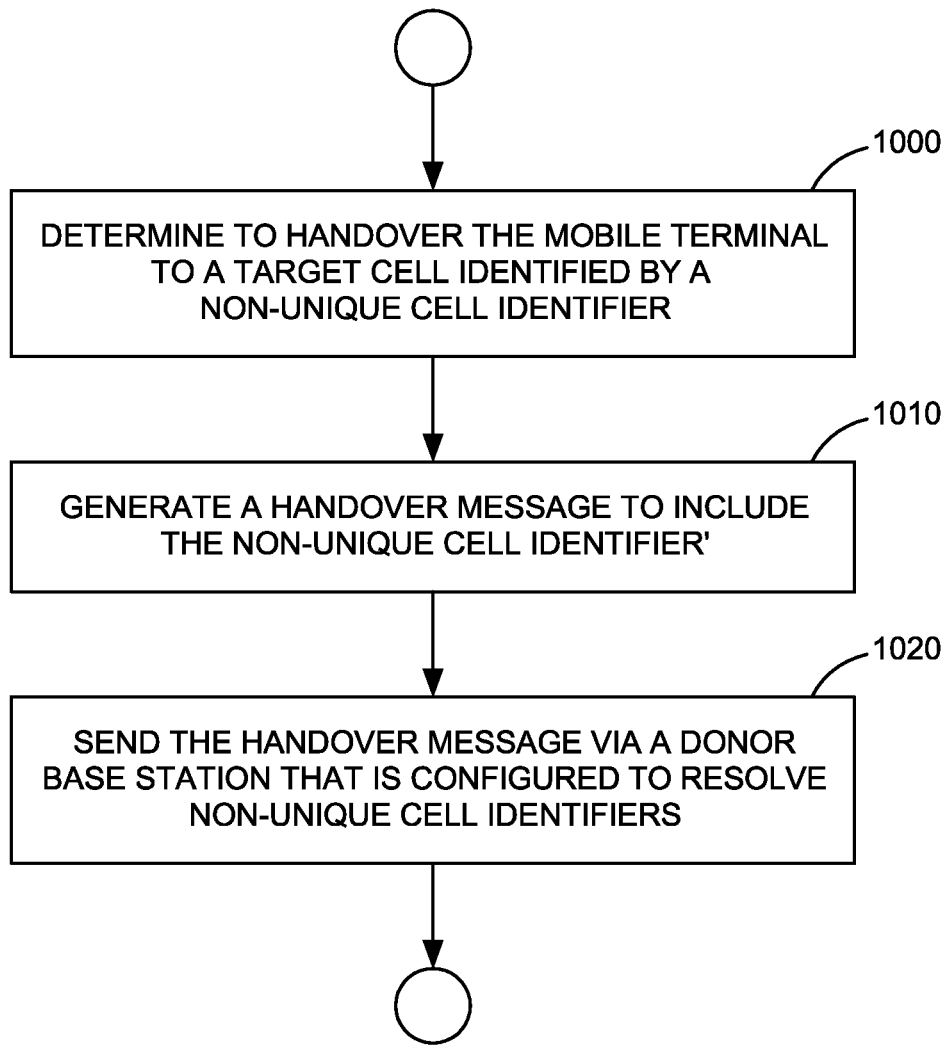
FIG. 10 is a logic flow diagram of a method implemented by a mobile relay node for handover of a mobile terminal according to one or more embodiments.
Figure 11:
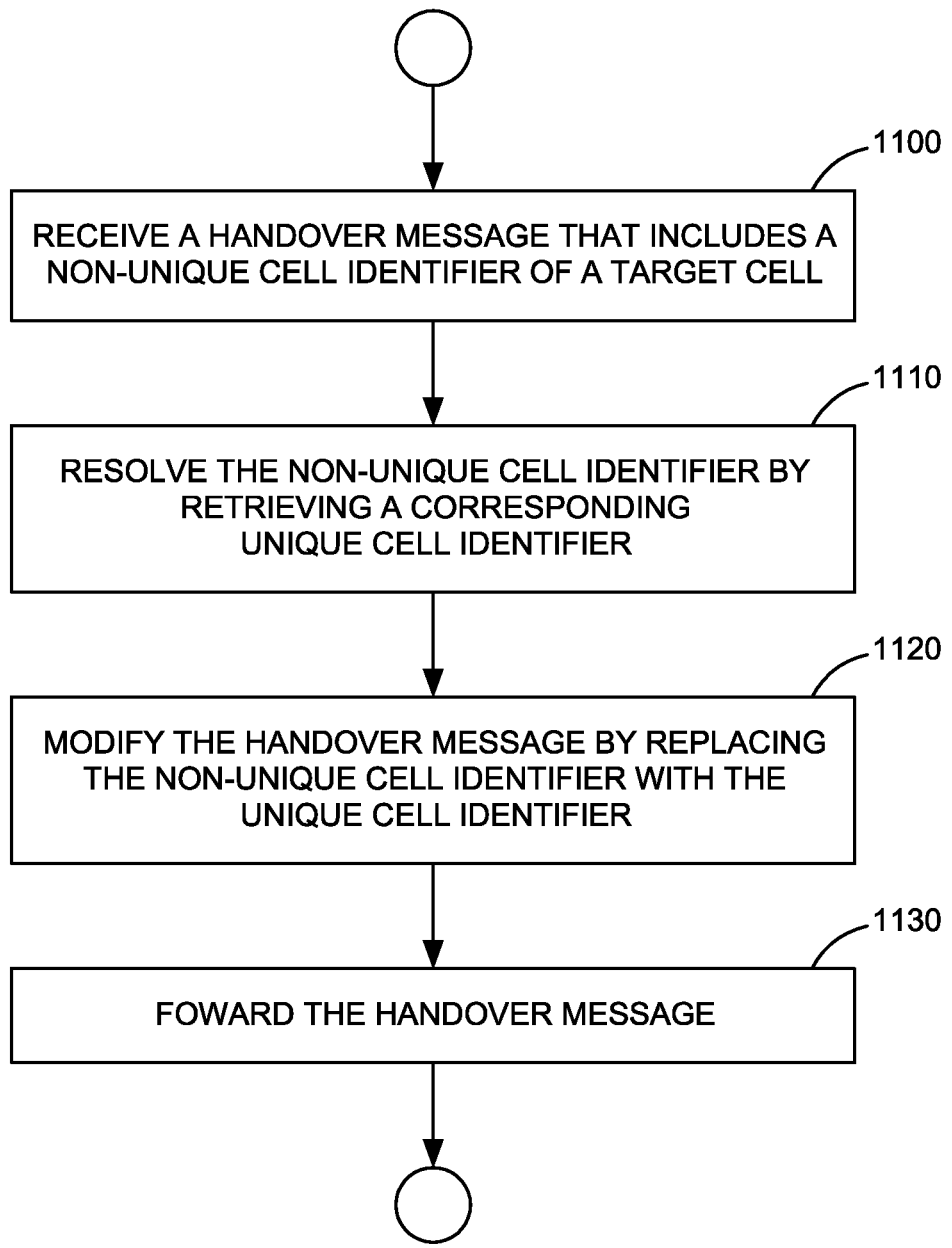
FIG. 11 is a logic flow diagram of a method implemented by a donor base station for handover of a mobile terminal according to one or more embodiments.

FIGS. 10 and 11 illustrate embodiments that address this problem. Broadly described, the embodiments permit the mobile RN 16 to identify a target cell with the cell's non-unique identifier in a handover message sent to the donor base station. The donor base station resolves this non-unique identifier and replaces it with the target cell's unique identifier. By compensating for the mobile RN's ignorance regarding the target cell's unique identifier, the donor base station effectively portrays the mobile RN 16 to other nodes in the system 10 as unambiguously identifying the target cell by its unique identifier.

FIG. 10 depicts processing performed by the mobile RN 16 in this regard. As shown in FIG. 10, processing at the mobile RN 16 includes determining to hand over a served mobile terminal 14 to a target cell 18 identified by a non-unique identifier (e.g., a PCI) (Block 1000). This may entail, for instance, receiving a report from the terminal 14 that identifies each of one or more candidate cells with a non-unique cell identifier, and selecting one of those candidate cells as the target cell 18. Regardless, processing then includes, responsive to recognizing that a mapping at the mobile RN 16 (e.g., an NRT) does not map the non-unique cell identifier of the target cell 18 to a corresponding unique cell identifier (e.g., a CGI), generating a handover message for initiating the handover to include the non-unique cell identifier of the target cell 18 (Block 1010). Finally, processing includes sending the generated handover message towards the target cell 18, via a donor base station 12 that is configured to resolve non-unique cell identifiers (Block 1020).

As shown in FIG. 11, corresponding processing at the donor base station 12 includes receiving this handover message that includes the non-unique cell identifier of a target cell 18 (Block 1100). Processing then includes resolving the non-unique cell identifier of the target cell 18 by retrieving the corresponding unique cell identifier from a mapping of non-unique cell identifiers to unique cell identifiers (e.g., an NRT) (Block 1110). Processing further includes modifying the handover message by replacing the non-unique cell identifier in the message with the retrieved unique cell identifier (Block 1120). Finally, processing includes forwarding the modified handover message towards the target cell 18 for initiating the handover (Block 1130). Such forwarding may entail transmitting the handover message to the target cell 18 itself (e.g., via an X2 interface), or to a mobility management entity (e.g., via an S1 interface).

In some embodiments, the donor base station 12 will not actually be able to resolve the non-unique identifier of a target cell 18, e.g., if its mapping does not map the non-unique identifier to a corresponding unique identifier. In this case, the donor base station 12 generates an error message that indicates the donor base station 12 cannot resolve the non-unique identifier and sends that error message to the mobile RN 16. Responsive to receiving the error message, the mobile RN 16 resorts to conventional ways of obtaining the unique identifier of the target cell 18. That is, the mobile RN 16 instructs the mobile terminal 14 to detect the unique identifier of the target cell 18 from system information broadcast by that target cell. Then, once the mobile RN 16 receives the unique identifier detected by the mobile terminal 14, it can generate another handover message for initiating the handover to include that unique identifier and send the generated message towards the donor base station 12.

The mobile RN 16 in at least one embodiment also assists future resolving attempts of the donor base station 12 by sending the unique cell identifier received from the mobile terminal 14 to the donor base station 12. The donor base station 12 correspondingly updates its mapping to map the non-unique cell identifier of the target cell 18 to the received unique cell identifier. This way, the donor base station 12 will be able to resolve the non-unique identifier of the target cell 18 in the future, without having to send an error message back to the requesting mobile RN 14.

In view of the above variations, FIG. 12 provides a helpful overview of the processing performed at the mobile RN 14 and donor base station 12 under the different conditions discussed. Briefly, after the mobile RN 14 receives measurement reports from the mobile terminal 14 (Block 1200), it determines to hand over the terminal 14 to a particular target cell 18 (Block 1205). If the mobile RN 16 can map the target cell's non-unique identifier to a corresponding unique identifier (Yes at Block 1210), then it sends a handover message that includes the target cell's unique identifier (Block 1215). Otherwise, if the mobile RN 16 cannot map the target cell's non-unique identifier to a corresponding unique identifier (No at Block 1210), the mobile RN 16 sends a handover message that includes the non-unique identifier (Block 1220). The donor base station 12 attempts to resolve this non-unique identifier (Block 1225). If the donor base station 12 can map the target cell's non-unique identifier to a corresponding unique identifier (Yes at Block 1230), then it modifies the handover message by replacing the non-unique identifier with the unique identifier (Block 1235). Otherwise, the donor base station 12 sends an error message to the mobile RN 16 (Block 1240). Upon receiving this error message, the mobile RN 14 instructs the terminal 14 to detect the unique cell identifier (Block 1245), sends a handover message that includes that unique cell identifier (Blocks 1250 and 1215), and reports the unique cell identifier to the donor base station (Block 1255).

Embodiments thus facilitate efficient handover of mobile terminals 14 to or from a mobile cell 20, by reusing already existing neighbor cell information at the donor base station 12. Moreover, by avoiding the need for the mobile RN 16 or its served terminals 14 to obtain the unique cell identifiers of neighbor cells, the embodiments reduce the likelihood of service interruption or even handover failures.

Figure 13:
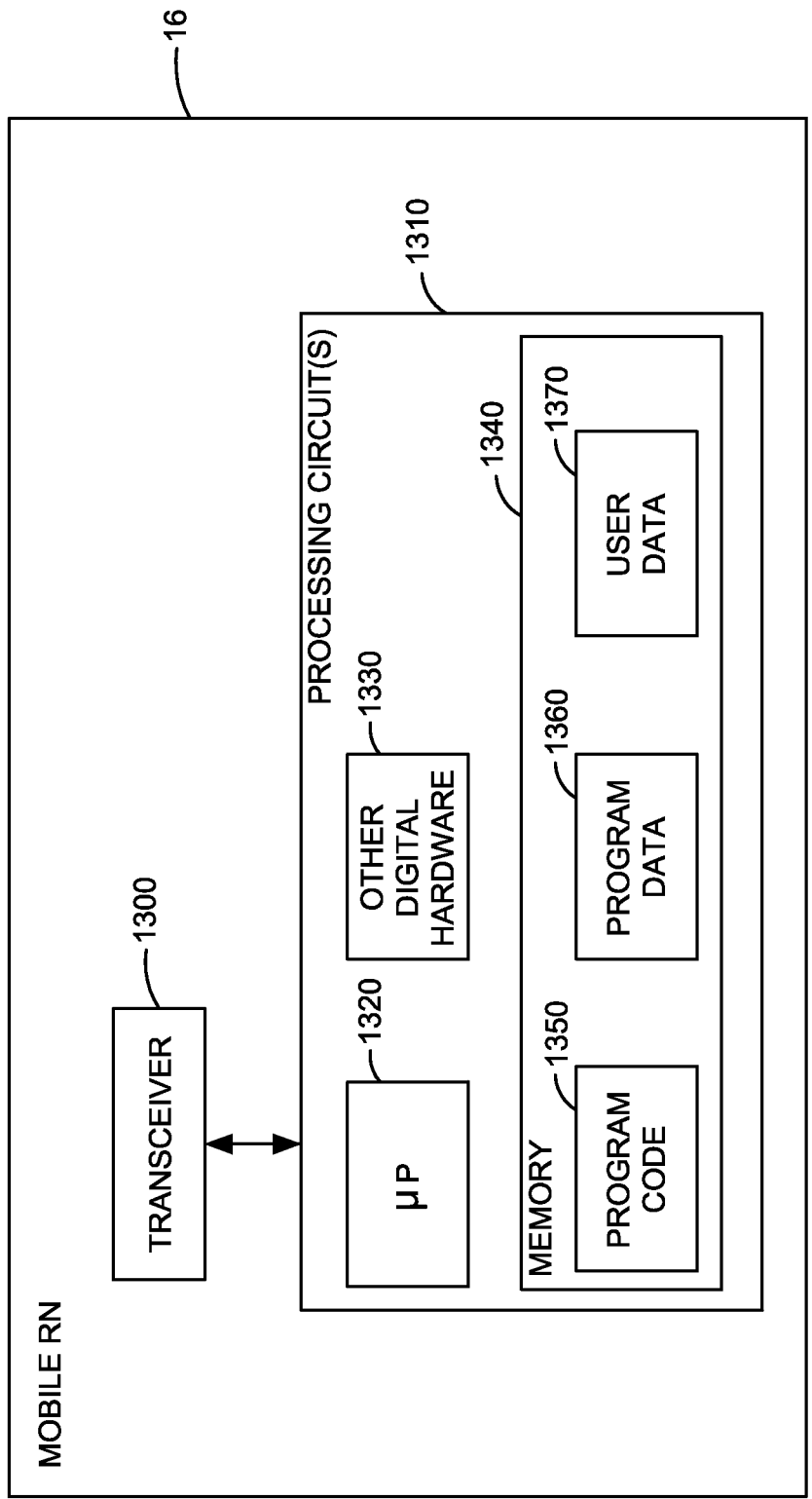
FIG. 13 is a block diagram of a mobile relay node configured to implement any of the methods in FIG. 2 or 10.

Apparatus configured to carry out the techniques described above are illustrated in FIGS. 13-19. FIG. 13 is a block diagram of a mobile RN 16 configured according to any of the techniques disclosed herein. In particular, mobile RN 16 may be configured to implement the methods illustrated in FIG. 2 or 10, or variants thereof. The mobile RN 16 includes a transceiver circuit 1300, which includes various radio-frequency components (not shown) for sending radio signals to and processing radio signals received from one or more donor base stations 12 and/or one or more served mobile terminals 14. More particularly, the transceiver circuit 1300 is configured to convert the received radio signals into digital samples for processing by one or more processing circuits 1310. The one or more processing circuits 1310 extract data from signals received via transceiver 1300 and generate information for transmission via the transceiver 1300. In this regard, the transceiver 1300 uses known radio processing and signal processing techniques, typically according to one or more telecommunications standards, and is configured to format digital data and condition a radio signal, from that data, for transmission over the air.

The one or more processing circuits 1310 in particular comprise one or several microprocessors 1320, digital signal processors, and the like, as well as other digital hardware 1330 and memory circuit 1340. Memory 1340, which may comprise one or several types of memory such as read-only memory (ROM), random-access memory, cache memory, flash memory devices, optical storage devices, etc., stores program code 1350 for executing one or more telecommunications and/or data communications protocols and for carrying out one or more of the techniques described herein. Memory 1340 further stores program data 1360, user data 1360 received from a donor base station 12 and/or a mobile terminal 14, and also stores various parameters and/or other program data for controlling the operation of the mobile RN 12.

Figure 14:
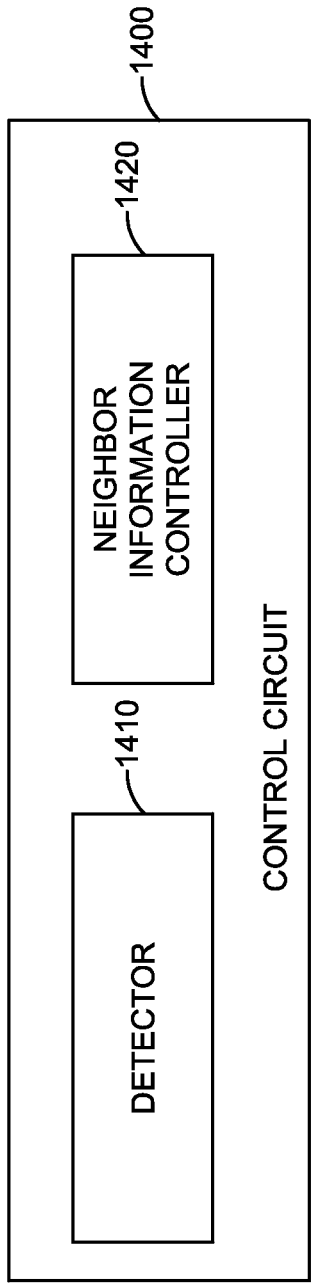
FIGS. 14 and 15 are block diagrams of different mobile relay node control circuits configured to implement the methods in FIGS. 2 and 10, respectively.

Of course, not all of the steps of the techniques described herein are necessarily performed in a single microprocessor or even in a single module. Thus, FIG. 14 presents a more generalized view of a mobile RN control circuit 1400 configured to carry out the method shown in FIG. 2. This mobile RN control circuit 1400 may have a physical configuration that corresponds directly to processing circuits 1310, for example, or may be embodied in two or more modules or units. In either case, control circuit 1400 is configured with modules or sub-circuits to carry out operations in accordance with the method in FIG. 2. These units are pictured in FIG. 14 as a detector 1410 and a neighbor information controller 1420.

The detector 1410 detects the occurrence of a defined condition which characteristically indicates that movement of the mobile RN 12 has rendered previously obtained neighbor cell information incomplete or invalid. The neighbor information controller 1420, responsive to the detector's detection, sends a request for neighbor cell information to a donor base station 12 in the system, and receives the requested information responsive to the request.

Figure 15:
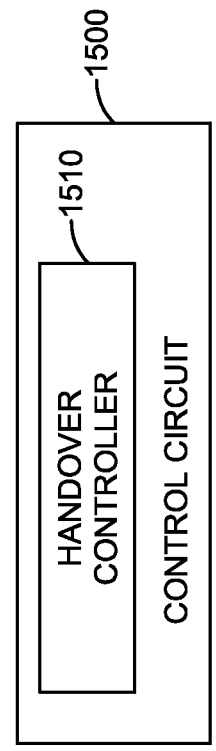

FIG. 15, by contrast, presents a more generalized view of a mobile RN control circuit 1500 configured to carry out the method shown in FIG. 10. This mobile RN control circuit 1500 may also have a physical configuration that corresponds directly to processing circuits 1310, for example, or may be embodied in two or more modules or units. In either case, control circuit 1500 is configured with at least one module or sub-circuit to carry out operations in accordance with the method in FIG. 10. This at least one unit is pictured in FIG. 15 as a neighbor information controller 1510.

The neighbor information controller 1510 determines to handover a mobile terminal 14 to a target cell 18 identified by a non-unique identifier. The controller 1510, responsive to recognizing that a mapping at the mobile RN 16 does not map the non-unique cell identifier of the target cell 18 to a corresponding unique cell identifier, then generates a handover message for initiating handover to include the non-unique cell identifier of the target cell 18. Finally, the controller 1510 sends the generated handover message towards the target cell 18 via a donor base station 12 that is configured to resolve non-unique cell identifiers.

Figure 16:
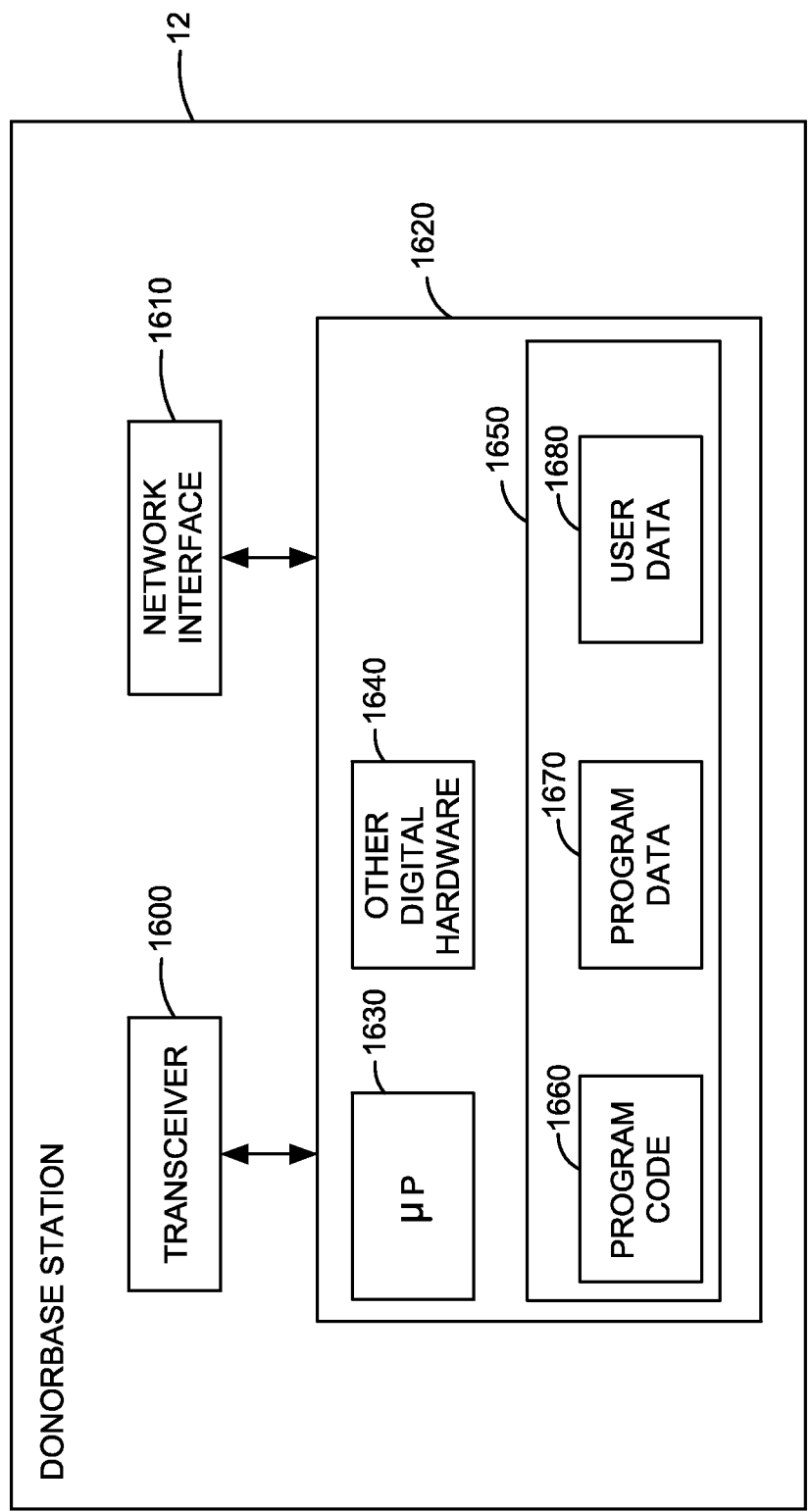
FIG. 16 is a block diagram of a donor base station configured to implement any of the methods in FIG. 4, 9, or 11.

FIG. 16 is a block diagram of a donor base station 12 configured according to any of the techniques disclosed herein. In particular, donor base station 12 may be configured to implement the methods illustrated in FIG. 4, 8, or 11, or variants thereof. The donor base station 12 includes a transceiver circuit 1600 and a network interface 1610 to other base stations 12 and/or other nodes in the system 10. The transceiver circuit 1600, in particular, includes various radio-frequency components (not shown) for sending radio signals to and processing radio signals received from the mobile RN 16. More particularly, the transceiver circuit 1600 is configured to convert the received radio signals into digital samples for processing by one or more processing circuits 1620. The one or more processing circuits 1620 extract data from signals received via transceiver 1600 and generate information for transmission via the transceiver 1600. In this regard, the transceiver 1600 uses known radio processing and signal processing techniques, typically according to one or more telecommunications standards, and is configured to format digital data and condition a radio signal, from that data, for transmission over the air.

The one or more processing circuits 1620 comprise one or several microprocessors 1630, digital signal processors, and the like, as well as other digital hardware 1640 and memory circuit 1650. Memory 1650, which may comprise one or several types of memory such as read-only memory (ROM), random-access memory, cache memory, flash memory devices, optical storage devices, etc., stores program code 1660 for executing one or more telecommunications and/or data communications protocols and for carrying out one or more of the techniques described herein. Memory 1650 further stores program data 1670, user data 1680 received from the mobile RN 16, and also stores various parameters and/or other program data for controlling the operation of the donor base station 12.

Figure 17:
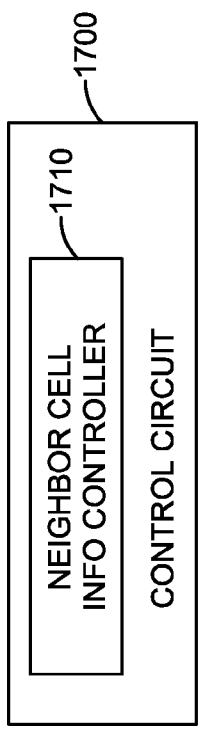
FIGS. 17, 18, and 19 are block diagrams of different donor base station control circuits configured to implement the methods in FIGS. 4, 9, and 11, respectively.

Of course, not all of the steps of the techniques described herein are necessarily performed in a single microprocessor or even in a single module. Thus, FIG. 17 presents a more generalized view of a donor base station control circuit 1700 configured to carry out the method shown in FIG. 4. This donor base station control circuit 1700 may have a physical configuration that corresponds directly to processing circuits 1620, for example, or may be embodied in two or more modules or units. In either case, control circuit 1700 is configured with a module or sub-circuit to carry out operations in accordance with the method in FIG. 4. This unit is pictured in FIG. 17 as a neighbor information controller 1710. The controller 1710 receives identifying information that identifies one or more cells 18 currently neighboring the mobile cell 20. The controller 1710 then selects from a set of neighbor cell information stored at the donor base station a subset of information which pertains to the one or more identified cells 12. Finally, the controller 1710 transmits, via the transceiver 1600, the selected subset of neighbor cell information for providing that subset to the mobile RN 16.

Figure 18:
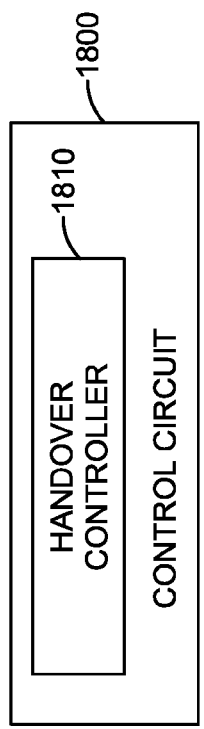

FIG. 18, by contrast, presents a more generalized view of a donor base station control circuit 1800 configured to carry out the method shown in FIG. 8. This donor base station control circuit 1800 may also have a physical configuration that corresponds directly to processing circuits 1620, for example, or may be embodied in two or more modules or units. In either case, control circuit 1800 is configured with at least one module or sub-circuit to carry out operations in accordance with the method in FIG. 8. This at least one unit is pictured in FIG. 15 as a handover controller 1810. The handover controller 1810 receives identifying information that identifies one or more cells 18 currently neighboring the mobile cell 20. The controller 1810 then determines to handover the mobile RN 16 to a target donor base station 12. Finally, the handover controller 1810, responsive to that determination, sends a handover message to the target donor base station that include the identifying information.

Figure 19:
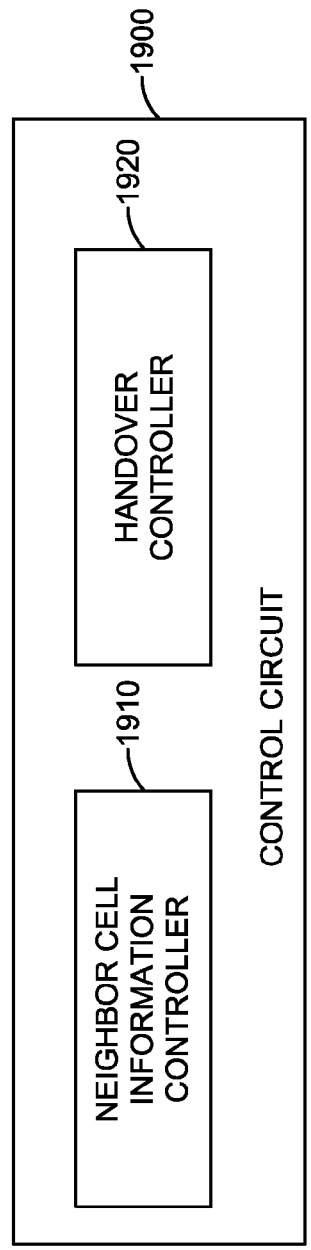

Finally, FIG. 19 presents a more generalized view of a donor base station control circuit 1900 configured to carry out the method shown in FIG. 11. This donor base station control circuit 1900 may also have a physical configuration that corresponds directly to processing circuits 1620, for example, or may be embodied in two or more modules or units. In either case, control circuit 1900 is configured with two or more modules or sub-circuits to carry out operations in accordance with the method in FIG. 11. These units are pictured in FIG. 19 as a neighbor information controller 1910 and a handover controller 1920.

The handover controller 1920 receives a handover message from the mobile RN 16 that includes a non-unique cell identifier of a target cell 18 to which a mobile terminal 14 is to be handed over. The neighbor information controller 1910 then resolves that non-unique cell identifier by retrieving a corresponding unique cell identifier from a mapping of non-unique cell identifiers to unique cell identifiers. Finally, the handover controller 1920 modifies the handover message by replacing the non-unique cell identifier in the message with the retrieved unique cell identifier, and forwards the modified message towards the target cell 18.

Those skilled in the art will thus appreciate that the various "circuits" described may refer to a combination of analog and digital circuits, and/or one or more processors configured with software stored in memory and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method for maintaining neighbor cell information at a mobile relay node in a wireless communication system, the method comprising:

detecting the occurrence of a defined condition which characteristically indicates that movement of the mobile relay node has rendered previously obtained neighbor cell information incomplete or invalid;

responsive to detecting the occurrence of the defined condition, generating a request for neighbor cell information, wherein the request includes non-unique cell identifiers for one or more cells currently neighboring a mobile cell provided by the mobile relay node, and sending the request for neighbor cell information to a donor base station in the system; and receiving the requested neighbor cell information responsive to the request, wherein said neighbor cell information pertains to those one or more neighboring cells and maps those non-unique cell identifiers to corresponding unique cell identifiers.

2. The method of claim 1, wherein said generating comprises generating the request to include identifiers of any cells detected by the mobile relay node and identifiers of any cells detected by mobile terminals served by the mobile relay node.

3. The method of claim 1, wherein said generating comprises selecting from a set of identifiers obtained by the mobile relay node a subset of those identifiers that have been obtained within a defined time period, and including said subset of identifiers in the request.

4. The method of claim 3, further comprising dynamically adapting said defined time period proportional to a speed at which the mobile relay node is currently moving.

5. The method of claim 1, wherein said defined condition comprises a defined number of non-unique cell identifiers being obtained by the mobile relay node for which the mobile relay node does not have corresponding unique cell identifiers.

6. The method of claim 1, wherein said defined condition comprises a defined number of non-unique cell identifiers being obtained by the mobile relay node for which the mobile relay node does not have corresponding unique cell identifiers and for which signal measurements have been reported by a particular mobile terminal that meet or exceed a predefined measurement threshold.

7. The method of claim 1, wherein said defined condition comprises any given non-unique cell identifier being reported to the mobile relay node a defined number of times by different mobile terminals served by the mobile relay node.

8. The method of claim 1, wherein said defined condition comprises a defined amount of time elapsing since the mobile relay node previously obtained neighbor cell information.

9. The method of claim 8, further comprising dynamically adapting said defined amount of time proportional to a speed at which the mobile relay node is currently moving.

10. The method of claim 1, wherein said defined condition comprises the mobile relay node being handed over from one donor base station to another.

11. The method of claim 1, further comprising:

storing the received neighbor cell information and associating that neighbor cell information with the donor base station in a mapping table; and responsive to subsequent handover of the mobile relay node to the donor base station, reverting to stored neighbor cell information that, according to the mapping table, is associated with the donor base station and selectively requesting neighbor cell information from the donor base station that pertains to any currently detected neighbor cells not addressed in the stored neighbor cell information.

12. The method of claim 1, wherein the wireless communication system is a Long Term Evolution (LTE) system.

13. A method implemented by a donor base station in a wireless communication system for providing neighbor cell information to a mobile relay node, the method comprising:
receiving identifying information that identifies one or more cells currently neighboring a mobile cell provided by the mobile relay node, wherein said receiving comprises receiving non-unique cell identifiers for said one or more identified cells;
selecting from a set of neighbor cell information stored at the donor base station a subset of information which pertains to the one or more identified cells, wherein the selected subset of neighbor cell information comprises a selected subset of unique cell identifiers mapped to the received non-unique cell identifiers; and
transmitting the selected subset of neighbor cell information for providing that subset to the mobile relay node.

14. The method of claim 13, wherein the wireless communication system is a Long Term Evolution (LTE) system, wherein a non-unique cell identifier comprises a physical cell identity (PCI), and wherein a unique cell identifier comprises a cell global identity (CGI).

15. The method of claim 13, wherein said receiving comprises receiving a handover message from a source donor base station and extracting the identifying information from that handover message.

16. The method of claim 13, further comprising:
storing the selected subset and associating that subset with the mobile relay node in a mapping table;
updating any neighbor cell information in the stored subset responsive to receiving a notification that such information has changed; and
responsive to subsequent handover of the mobile relay node to the donor base station, selectively sending the mobile relay node updates to the stored subset that, according to the mapping table, is associated with the mobile relay node.

17. A method implemented by a source donor base station for handing over a mobile relay node to a target donor base station in a wireless communication system, the method comprising:
receiving identifying information that identifies one or more cells currently neighboring a mobile cell provided by the mobile relay node, wherein said identifying information includes non-unique cell identifiers for said one or more identified cells, wherein said non-unique cell identifiers are mapped by the wireless communication system to corresponding unique cell identifiers;
determining to handover the mobile relay node to the target donor base station; and
responsive to said determination, sending a handover message to the target donor base station that includes said identifying information.

18. The method of claim 17, wherein the wireless communication system is a Long Term Evolution (LTE) system, wherein a non-unique cell identifier comprises a physical cell identity (PCI), and wherein a unique cell identifier comprises a cell global identity (CGI).

19. A mobile relay node in a wireless communication system comprising a transceiver and one or more processing circuits, wherein the one or more processing circuits are configured to maintain neighbor cell information at the mobile relay node by:
detecting the occurrence of a defined condition which characteristically indicates that movement of the mobile relay node has rendered previously obtained neighbor cell information incomplete or invalid;
responsive to detecting the occurrence of the defined condition, generating a request for neighbor cell information, wherein the request includes non-unique cell identifiers for one or more cells currently neighboring a mobile cell provided by the mobile relay node and sending the request for neighbor cell information to a donor base station in the system; and
receiving the requested neighbor cell information responsive to the request, wherein said neighbor cell information pertains to those one or more neighboring cells and maps those non-unique cell identifiers to corresponding unique cell identifiers.

20. A donor base station in a wireless communication system for providing neighbor cell information to a mobile relay node, the donor base station comprising a transceiver, a network interface, and one or more processing circuits configured to:
receive identifying information that identifies one or more cells currently neighboring a mobile cell provided by the mobile relay node, wherein said identifying information comprises non-unique cell identifiers for said one or more identified cells;
select from a set of neighbor cell information stored at the donor base station a subset of information which pertains to the one or more identified cells, wherein the selected subset of neighbor cell information comprises a selected subset of unique cell identifiers mapped to the received non-unique cell identifiers; and
transmit the selected subset of neighbor cell information for providing that subset to the mobile relay node.

21. A source donor base station for handing over a mobile relay node to a target donor base station in a wireless communication system, the source donor base station comprising:
a transceiver;
a network interface; and
one or more processing circuits configured to:
receive identifying information that identifies one or more cells currently neighboring a mobile cell provided by the mobile relay node, wherein said identifying information includes non-unique cell identifiers for said one or more identified cells, wherein said non-unique cell identifiers are mapped by the wireless communication system to corresponding unique cell identifiers;
determine to handover the mobile relay node to the target donor base station; and
responsive to said determination, send a handover message to the target donor base station that includes said identifying information.

* * * * *

UNITED STATES PATENT AND TRADEMARK OFFICE
CERTIFICATE OF CORRECTION

PATENT NO. : 9,049,627 B2
APPLICATION NO. : 13/383093
DATED : June 2, 2015
INVENTOR(S) : Teyeb et al.

It is certified that error appears in the above-identified patent and that said Letters Patent is hereby corrected as shown below:

On the Title Page, in Item (57), under "ABSTRACT", in Column 2, Line 1, delete "RN, (16)" and insert -- RN (16) --, therefor.

On the Title Page, in the Figure, for Tag "200", in Line 1, delete "OCCURENCE'" and insert -- OCCURRENCE --, therefor.

In Fig. 2, Sheet 2 of 17, for Tag "200", in Line 1, delete "OCCURENCE" and insert -- OCCURRENCE --, therefor.

In Fig. 5, Sheet 5 of 17, for Tag "550", in Line 2, delete "NEIGHBORS" and insert -- NEIGHBOR --, therefor.

In Fig. 6, Sheet 6 of 17, for Tag "620", in Line 2, delete "NEIGHBORS" and insert -- NEIGHBOR --, therefor.

In Fig. 7, Sheet 7 of 17, for Tag "620", in Line 2, delete "NEIGHBORS" and insert -- NEIGHBOR --, therefor.

In Fig. 10, Sheet 10 of 17, for Tag "1010", in Line 2, delete "IDENTIFIER'" and insert -- IDENTIFIER --, therefor.

In Fig. 11, Sheet 11 of 17, for Tag "1130", in Line 1, delete "FOWARD" and insert -- FORWARD --, therefor.

Figure 12A:
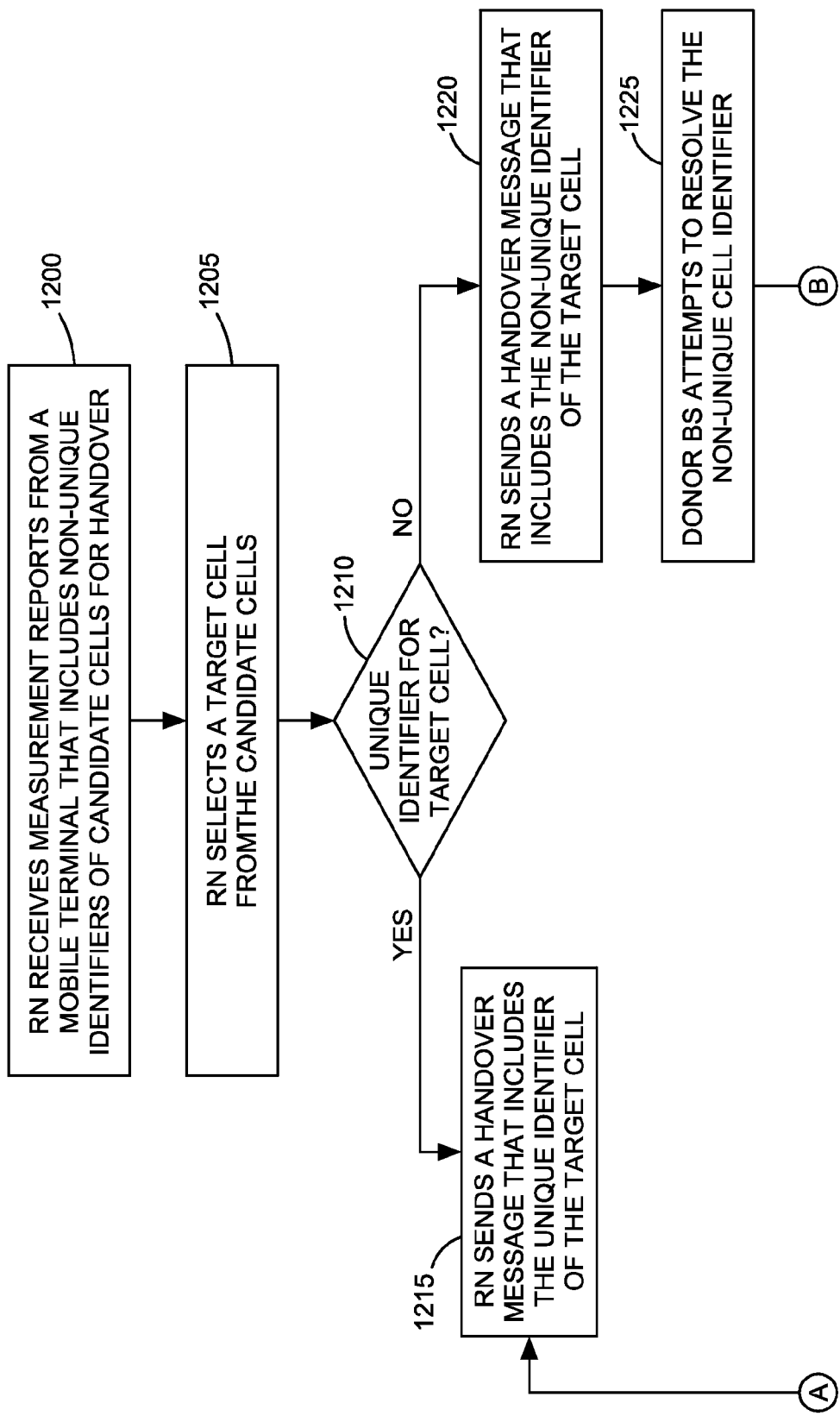
FIG. 12 is a logic flow diagram that illustrates an overview of processing performed by a mobile relay node and a donor base station for handover of a mobile terminal under different conditions, according to one or more embodiments.

In Fig. 12A, Sheet 12 of 17, for Tag "1205", in Line 2, delete "FROMTHE" and insert -- FROM THE --, therefor.

Figure 12B:
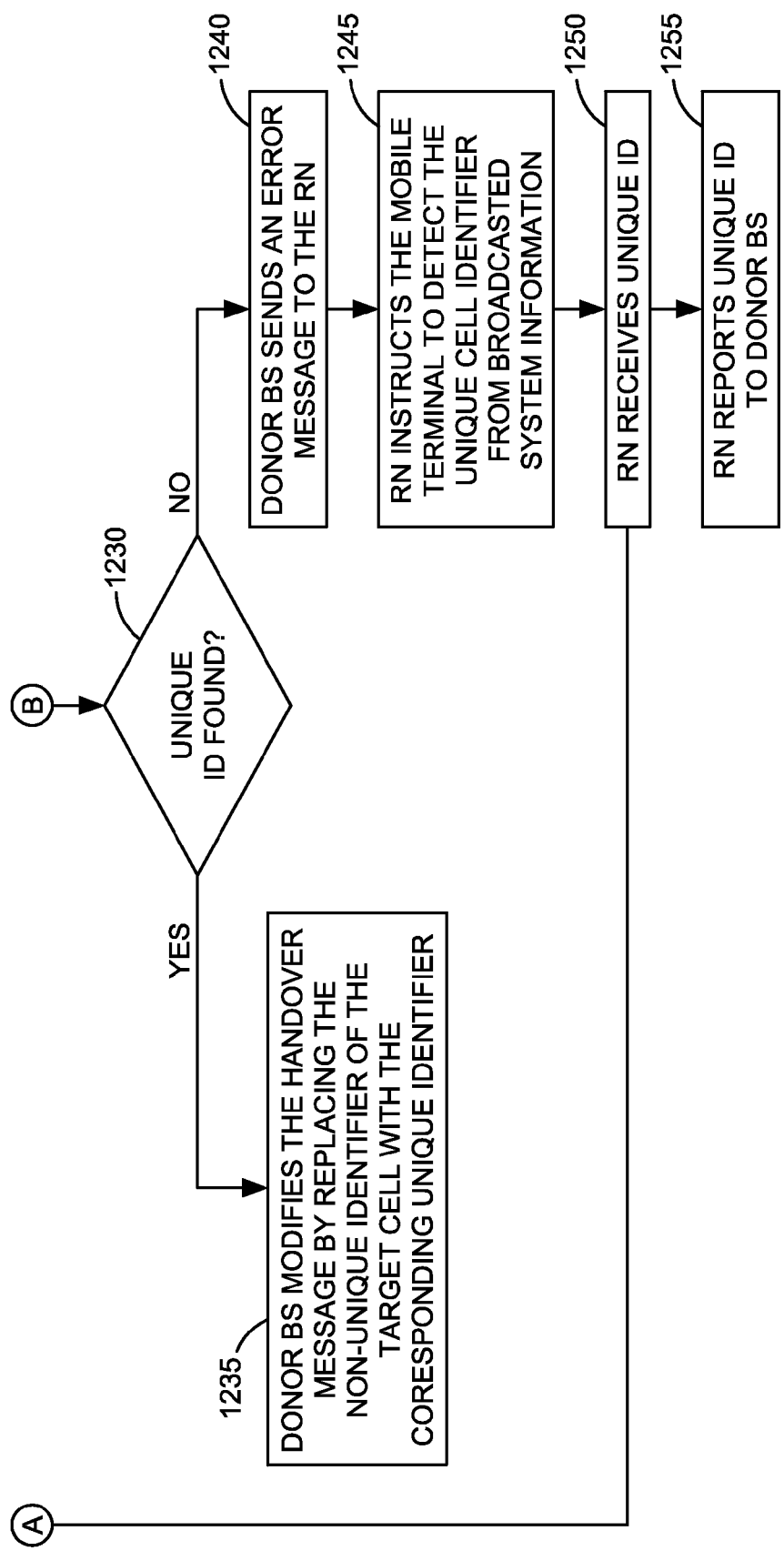

In Fig. 12B, Sheet 13 of 17, for Tag "1235", in Line 5, delete "CORESPONDING" and insert -- CORRESPONDING --, therefor.

Signed and Sealed this
Nineteenth Day of January, 2016

Michelle K. Lee
*Director of the United States Patent and Trademark Office*

CERTIFICATE OF CORRECTION (continued)
U.S. Pat. No. 9,049,627 B2

In Column 1, Line 7, delete "§119(e)" and insert -- § 119(e) --, therefor.

In Column 1, Line 28, delete "Pas exist" and insert -- PCIs exist --, therefor.

In Column 1, Line 28, delete "of Pas" and insert -- of PCIs --, therefor.

In Column 1, Line 30, delete "Pas in" and insert -- PCIs in --, therefor.

In Column 1, Line 38, delete "the Pas" and insert -- the PCIs --, therefor.

In Column 1, Line 55, delete "eNBs" and insert -- The cNBs --, therefor.

In Column 8, Line 27, delete "of Pas" and insert -- of PCIs --, therefor.

In Column 8, Line 36, delete "RN 14" and insert -- RN 16 --, therefor.

In Column 10, Line 35, delete "cells 12-2 and 12-3)" and insert -- cells 18-2 and 18-3) --, therefor.

In Column 11, Line 65, delete "target cell 18-1" and insert -- donor cell 18-1 --, therefor.

In Column 12, Lines 35-36, delete "of a" and insert -- of an --, therefor.

In Column 14, Line 50, delete "RN 14." and insert -- RN 16. --, therefor.

In Column 14, Line 52, delete "RN 14" and insert -- RN 16 --, therefor.

In Column 14, Line 54, delete "RN 14" and insert -- RN 16 --, therefor.

In Column 15, Line 6, delete "RN 14" and insert -- RN 16 --, therefor.

In Column 15, Lines 49-50, delete "user data 1360" and insert -- user data 1370 --, therefor.

In Column 15, Lines 52-53, delete "RN 12." and insert -- RN 16. --, therefor.

In Column 16, Line 1, delete "RN 12" and insert -- RN 16 --, therefor.

In Column 17, Line 12, delete "cells 12." and insert -- cells 18. --, therefor.